(12) United States Patent
Wang et al.

(10) Patent No.: US 7,200,683 B1
(45) Date of Patent: Apr. 3, 2007

(54) DEVICE COMMUNICATION AND CONTROL IN A HOME NETWORK CONNECTED TO AN EXTERNAL NETWORK

(75) Inventors: Dongyan Wang, Santa Clara, CA (US); Richard Humpleman, Fremont, CA (US)

(73) Assignee: Samsung Electronics, Co., Ltd., Suwon (KR)

( * ) Notice: Subject to any disclaimer, the term of this patent is extended or adjusted under 35 U.S.C. 154(b) by 861 days.

(21) Appl. No.: 09/633,289

(22) Filed: Aug. 4, 2000

Related U.S. Application Data

(60) Provisional application No. 60/166,602, filed on Nov. 19, 1999, provisional application No. 60/149,515, filed on Aug. 17, 1999.

(51) Int. Cl.
*G06F 15/16* (2006.01)
(52) U.S. Cl. .................. 709/250; 715/734; 725/141
(58) Field of Classification Search ............... 709/218, 709/200–203, 217, 219, 220–227, 250; 345/519–520; 715/716, 719, 733–738; 725/37, 141
See application file for complete search history.

(56) References Cited

U.S. PATENT DOCUMENTS 4,031,543 A 6/1977 Holz (Continued)

FOREIGN PATENT DOCUMENTS

EP 84110755.0 9/1984

(Continued)

OTHER PUBLICATIONS

Y. Takabatake et al., "A Testbed for Home Network based on IEEE1394," The Institute of Electronics, Information and Communications Engineers, Technical Report of IEICE IN98-43, Jul. 1998, vol. 98, No. 181.

(Continued)

*Primary Examiner*—Moustafa M. Meky
(74) *Attorney, Agent, or Firm*—Kenneth L. Sherman, Esq.; Michael Zarrabian, Esq.; Myers Dawes Andras & Sherman, LLP

(57) ABSTRACT

A method for providing user interfaces in a first network including first devices interconnected via a communication medium and an interface device connecting the first network to a second network having interconnected second devices providing services. The user interfaces are for controlling the devices that are currently connected to the first network and communication with devices that are currently connected to the second network. The method includes: (a) obtaining information from first devices currently connected to the first network, the information including device information; (b) obtaining information from second devices via the interface device, about the services of second devices connected to the second network; (c) generating a user interface description in one or more of the first devices based on the obtained information. The user interface description in each first device includes: (1) a reference associated with the device information of each of the first devices, and (2) a reference associated with the service information of each of the second devices. A user interface is displayed based on each user interface description on a device connected to the first network capable of displaying a user interface, for user control of the first devices and communication with the second devices. Displaying each user interface is based on using each reference in the corresponding user interface description to access the associated information in each device; generating the user interface including device and service corresponding to each device using the accessed information in each device; and displaying the user interface.

53 Claims, 17 Drawing Sheets

U.S. PATENT DOCUMENTS

| | | |
|---|---|---|
| 4,860,006 A | 8/1989 | Barall |
| 5,249,043 A | 9/1993 | Grandmougin |
| 5,293,635 A | 3/1994 | Faulk, Jr. et al. |
| 5,347,304 A | 9/1994 | Moura et al. |
| 5,387,927 A | 2/1995 | Look et al. |
| 5,389,963 A | 2/1995 | Lepley et al. |
| 5,392,033 A | 2/1995 | Oman et al. |
| 5,452,291 A | 9/1995 | Eisenhandler et al. |
| 5,488,412 A | 1/1996 | Majeti et al. |
| 5,546,484 A | 8/1996 | Fling et al. |
| 5,561,709 A | 10/1996 | Remillard |
| 5,572,643 A | 11/1996 | Judson |
| 5,579,308 A * | 11/1996 | Humpleman ............... 370/352 |
| 5,612,730 A | 3/1997 | Lewis |
| 5,826,000 A | 10/1998 | Hamilton |
| 5,886,732 A | 3/1999 | Humpleman |
| 5,940,072 A | 8/1999 | Jahanghir et al. |
| 5,940,387 A | 8/1999 | Humpleman |
| 6,005,861 A | 12/1999 | Humpleman |
| 6,011,909 A * | 1/2000 | Newlin et al. ............. 709/227 |
| 6,020,924 A | 2/2000 | Jahanghir |
| 6,032,202 A | 2/2000 | Lea et al. |
| 6,037,933 A | 3/2000 | Blonstein et al. |
| 6,052,750 A | 4/2000 | Lea |
| 6,078,783 A | 6/2000 | Kawamura et al. |
| 6,085,236 A | 7/2000 | Lea |
| 6,101,499 A | 8/2000 | Ford et al. |
| 6,101,530 A * | 8/2000 | Rosenberg et al. ......... 709/203 |
| 6,175,362 B1 | 1/2001 | Harms et al. |
| 6,181,333 B1 | 1/2001 | Chaney et al. |
| 6,182,094 B1 | 1/2001 | Humpleman et al. |
| 6,188,397 B1 | 2/2001 | Humpleman |
| 6,191,781 B1 | 2/2001 | Chaney et al. |
| 6,466,971 B1 * | 10/2002 | Humpleman et al. ....... 709/220 |
| 6,560,221 B1 * | 5/2003 | Hara et al. ................. 370/352 |
| 6,563,430 B1 * | 5/2003 | Kemink et al. ........ 340/825.49 |
| 6,700,592 B1 * | 3/2004 | Kou et al. .................. 715/771 |
| 6,941,340 B2 | 9/2005 | Kim et al. .................. 709/203 |
| 2001/0053274 A1 * | 12/2001 | Roelofs et al. ............... 386/46 |
| 2002/0046403 A1 * | 4/2002 | Kim et al. .................... 725/37 |

FOREIGN PATENT DOCUMENTS

| | | |
|---|---|---|
| EP | 90305213.2 | 5/1990 |
| EP | 91401245.5 | 5/1991 |
| EP | 96304709.3 | 6/1996 |
| EP | 96306507.3 | 9/1996 |
| EP | 96307200.4 | 9/1996 |
| EP | 96116873.9 | 10/1996 |
| EP | 97100356.1 | 1/1997 |
| EP | 97117812.4 | 10/1997 |
| EP | 0 838 768 | 4/1998 |
| JP | 9-261355 | 10/1997 |
| JP | 9-282263 | 10/1997 |
| JP | 09-325925 | 12/1997 |
| JP | 10-145773 | 5/1998 |
| JP | 10-149270 | 6/1998 |
| JP | 11-88406 | 3/1999 |
| JP | 11-194987 | 7/1999 |
| JP | 11-317756 | 11/1999 |
| JP | 11-355294 | 12/1999 |
| JP | 11-355357 | 12/1999 |
| JP | 2002-510415 | 4/2002 |
| WO | PCT/EP95/00191 | 1/1995 |
| WO | PCT/US95/00354 | 1/1995 |
| WO | PCT/US95/17108 | 12/1995 |
| WO | PCT/US96/18798 | 11/1996 |
| WO | PCT/US97/08490 | 5/1997 |
| WO | WO 97/18636 A2 | 5/1997 |
| WO | WO 98 59282 | 12/1998 |
| WO | WO 98/59282 A2 | 12/1998 |
| WO | WO 99 57839 | 11/1999 |

OTHER PUBLICATIONS

T. Saito et al., "Homenetwork Architecture Considering Digital Home Appliances," The Institute of Electronics, Information and Communications Engineers, Technical Report of IEICE, IN97-128, Nov. 1997, pp. 57-64, vol. 97, No. 368.

Y. Takabatake et al., "A Proposal of an Inter-Networking for the Residential Network," The Institute of Electronics, Information and Communications Engineers, Technical Report of IEICE, SSE97-19, IN97-19, Apr. 1997, pp. 73-79, vol. 97, No. 4.

K. Teramoto et al., "Design and Implementation of Home Gateway, Integrated Control of Digital Comsumer Appliances," 99-DPS-92, ISSN 0919-6072, Feb. 26, 1999, pp. 97-102, vol. 99, No. 18.

P. Johansson, "IPv4 over IEEE 1394," RFC2734, http://www.faqs.org/ftp/rfc/pdf/rfc2734.txt.pdf.

K. Fujisawa, "DHCP for IEEE 1394," RFC2855, http://www.faqs.org/ftp/rfc/pdf/rfc2855.txt.pdf.

* cited by examiner

1394 AND NON-1394 NETWORK SCENARIO FOR ADDRESS MANAGEMENT

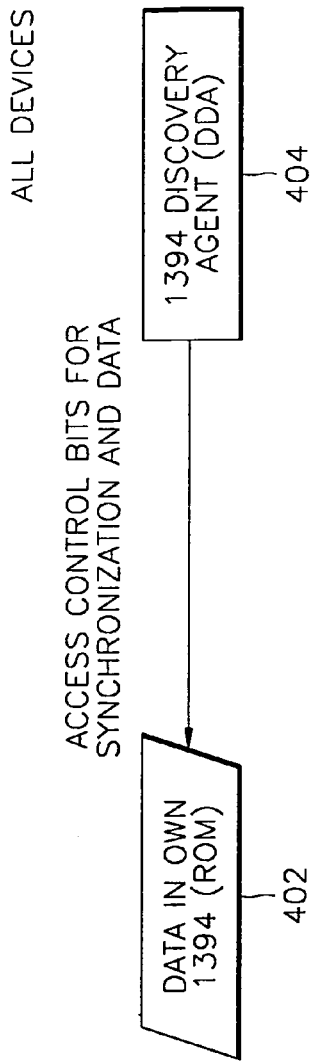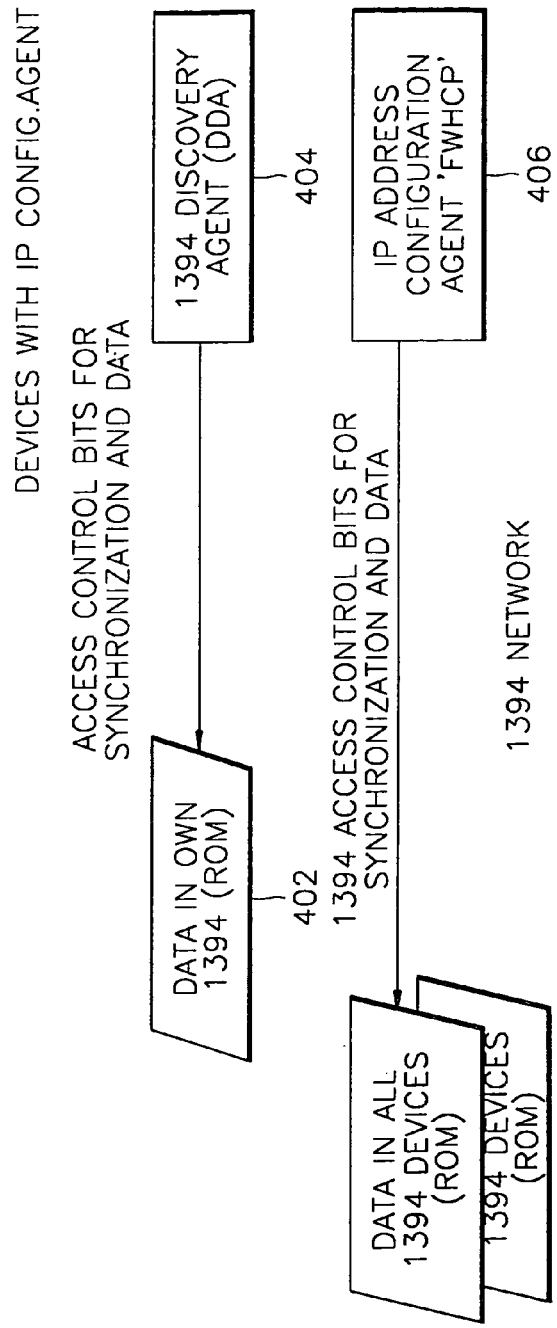

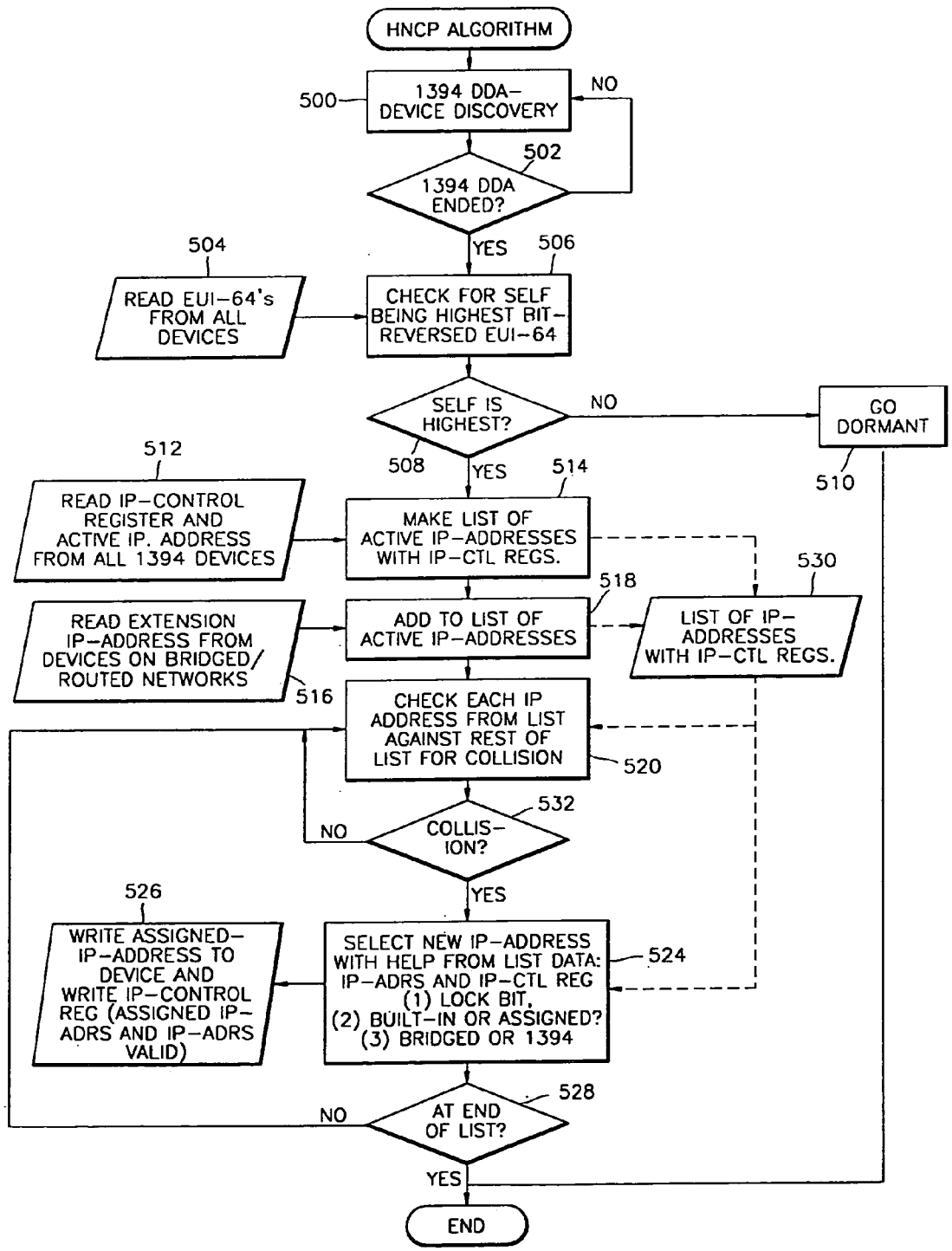

1394 and Non-1394 Network Scenario for address management

DEVICE COMMUNICATION AND CONTROL IN A HOME NETWORK CONNECTED TO AN EXTERNAL NETWORK

CROSS-REFERENCES TO RELATED APPLICATIONS

Applicants claim the benefit of U.S. Provisional Application No. 60/149,515 entitled "External Web Server Included in Home Network Top-Level User Interface Description," filed on Aug. 17, 1999, and U.S. Provisional Application No. 60/166,602 entitled "Regional Service Support for Home Network Top-Level Home Page and External Device Manufacturer's Portal Services," filed on Nov. 19, 1999 which applications are incorporated herein by reference.

NOTICE OF INCLUSION OF COPYRIGHTED MATERIAL

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to the field of networks, and more particularly, to home networks having multi-media devices connected thereto.

BACKGROUND OF THE INVENTION

A network generally includes a communication link and various devices with communication capability connected to the communication link. The devices include computers, peripheral devices, routers, storage devices, and appliances with processors and communication interfaces. An example of a network is a home network for a household in which various devices are interconnected. A usual household can contain several devices including personal computers and home devices that are typically found in the home. As such the term "device" typically includes logical devices or other units having functionality and an ability to exchange data, and can include not only all home devices but also general purpose computers. Home devices include such electronic devices as security systems, theater equipment, TVS, VCRs, stereo equipment, and direct broadcast satellite services or (DBSS), also known as digital satellite services (DSS), sprinkler systems, lighting systems, micro waves, dish washer, ovens/stoves, washers/dryers, and a processing system in an automobile.

In general, home devices are used to perform tasks that enhance a homeowner's life style and standard of living. For example, a dishwasher performs the task of washing dirty dishes and relieves the homeowner of having to wash the dishes by hand. A VCR can record a TV program to allow a homeowner to watch a particular program at a later time. Security systems protect the homeowner's valuables and can reduce the homeowner's fear of unwanted entry.

Home devices, such as home theater equipment, are often controlled using a single common control unit, namely a remote control device. This single common control unit allows a homeowner to control and command several different home devices using a single interface. Thus, may manufacturers have developed control units for controlling and commanding their home devices from a single interface.

One drawback associated with using the remote control unit to command and control home devices is that it provides static and command logic for controlling and commanding each home device. Therefore, a particular remote control unit can only control and command those home devices for which it includes the necessary control and command logic. For example, if a remote control unit comprises logic for controlling a television (TV), a video cassette recorder (VCR), and a digital video device (DVD), but not a compact disk (CD) unit, the remote control unit can not be used to command and control the CD unit. In addition, as new home devices are developed, the remote control unit will not be able to control and command the new home devices that require control and command logic that was not known at the time the remote control unit was developed.

Further, typically a remote control unit can only be used to command and control those home devices that are within the signal range of the remote control unit. Therefore, a user cannot use the remote control unit from a single location in the house to control and command home devices that are interconnected, but located in separate areas of the home. For example, a VCR that is located upstairs in a bedroom may be connected to a TV that is downstairs in the family room. If a user wishes to play a tape contained in the VCR located upstairs in the bedroom, on the TV located downstairs in the family room, the user cannot control and command both the TV and the VCR from a single location.

Another drawback associated with using remote control units is that known remote control units cannot control a plurality of diverse devices, and more particularly, cannot control a plurality of devices having different capabilities to communicate with each other in order to accomplish tasks or provide a service. Further, conventional network systems do not provide a mechanism for software applications in different network devices to automatically communicate with one another in order to accomplish tasks without direct user command.

To alleviate the above problems, some network models provide a central/singular user interface (UI) in one device including static device information for networked devices for user control of network devices. However, in such networks a change to device information (e.g., ICON) in a device requires a change to, and rebuilding of, the top level page. Further, if the device displaying the central user interface becomes unavailable, user control of the network is curtailed. Another problem with the central/singular page is that every UI device must display the same page, and a scope is not provided for each manufacturer to generate its own UI look and feel nor alter the technology used in the UI device. The content of an icon/information representing a device cannot be changed, and a UI device cannot display a more prominent look to a device icon such as the icon for the UI device itself. Nor can a UI builder tool obtain e-business icons from an external Web Portal. Such a model cannot be standardized for industry use because a central/single UI device controls the UI.

Further, existing networks only allow communication and control of devices connected to a network (e.g., 1394) using said central user interface, without the ability to provide user interface and control of devices and services connected to another different network (e.g., Internet).

There is, therefore, a need for a method and a system which provides dynamic control and command devices in a home network. There is also a need for such a method and system to provide the ability for accessing devices connected to a first network and accessing devices and services connected to a second different network, and to independently generate different user interface representations of the devices connected to the first and of devices and services connected to the second network for user control and communication.

BRIEF SUMMARY OF THE INVENTION

The present invention satisfies these needs. In one embodiment, the present invention provides a method and system for providing user interfaces in a first network including first devices interconnected via a communication medium and at least one interface device connecting said first network to at least a second network having interconnected second devices providing services, the user interfaces for controlling the devices that are currently connected to the first network and devices that are currently connected to the second network. The method includes the steps of: (a) obtaining information from one or more of first devices currently connected to the first network, said information including device information; (b) obtaining information from one or more of the second devices via the interface device, about the services provided by such devices connected to the second network; (c) generating a user interface description in one or more of said first devices based at least on the obtained information, the user interface description in each first device including: (1) at least one reference associated with the device information of each of said first devices, and (2) at least one reference associated with the service information of one or more of said second devices.

Further, a user interface is displayed based on each user interface description on a device connected to the first network capable of displaying a user interface, for user control of said first devices and communication with said second devices. Displaying each user interface is based on using each reference in the corresponding user interface description to access the associated information in each first device, and associated service information in each second device; generating the user interface including information corresponding to each device using the accessed information in each device; and displaying the user interface on said device capable of displaying a user interface.

BRIEF DESCRIPTION OF THE DRAWINGS

These and other features, aspects and advantages of the present invention will become better understood with regard to the following description, appended claims and accompanying drawings where:

FIGS. 9a–c show example functional block diagrams of connections to data and control bits of an embodiment of a discovery system architecture in a network according to another aspect of the present invention;

FIG. 10 shows an example flow diagram for discovery and configuration agents in the home network in connection with the functional block diagrams in FIGS. 9a–c;

Figure 1:
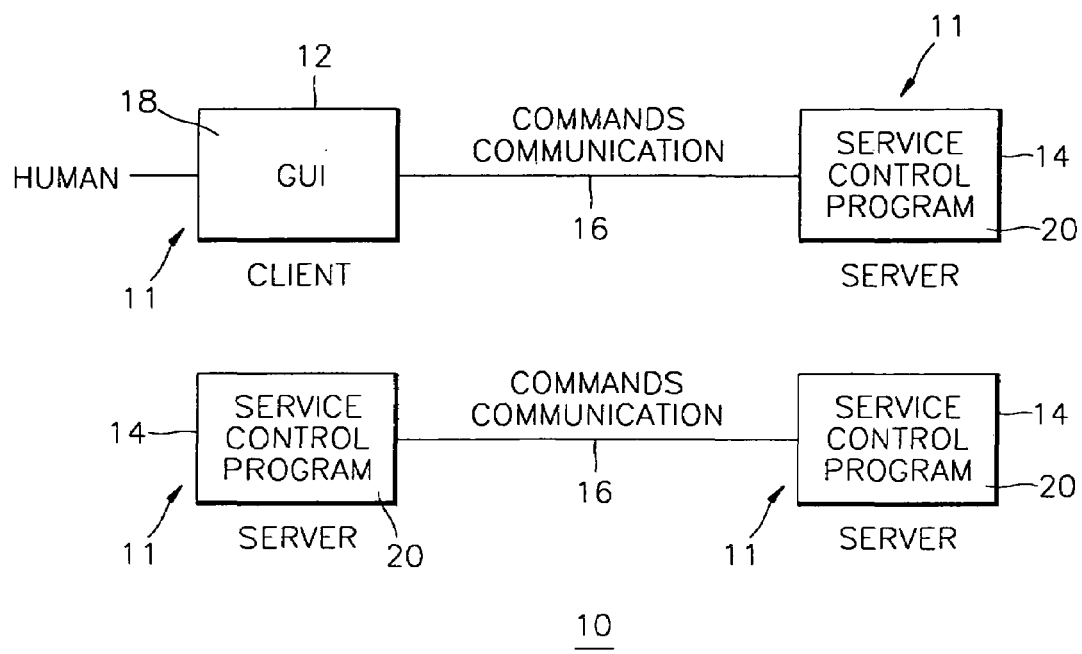
FIG. 1 shows an example block diagram of the architecture of an embodiment of a network according to the present invention.

Appendices 1–4, illustrative examples for: (1) Top-Level Page description 250 (Appendix 1); (2) Background.htm (Appendix 2); (3) Icon.htm (Appendix 4); and (4) Name.htm (Appendix 4); and Appendices 5–12, illustrative examples for the following htm files for generating the top level home network user interface description and GUI in FIGS. 12–13, wherein:

Appendix 5—Top-Level Page Example TLNUID (index.htm) Appendix 6—background.htm example Appendix 7—icon.htm example Appendix 8—Example name.htm Appendix 9—Example logoicon1.htm Appendix 10—Example logoname1.htm Appendix 11—Example logoicon2.htm Appendix 12—Example logoname2.htm To facilitate understanding, identical reference numerals have been used, where possible, to designate identical elements that are common throughout the figures.

DETAILED DESCRIPTION OF THE INVENTION

Network Overview

Referring to FIG. 1, in an embodiment of the present invention, a network 10 comprises multiple devices 11 including at least one client device 12 and at least one server device 14 interconnected via a communication link 16. The communication link 16 can include a 1394 serial bus providing a physical layer (medium) for sending and receiving data between the various connected home devices. The 1394 serial bus supports both time-multiplexed audio/video (A/V) streams and standard IP (Internet Protocol) communications (e.g., IETF RFC 2734). In certain embodiments, a home network uses an IP network layer as the communication layer for the home network. However, other communication protocols could be used to provide communication for the home network. For example, the invention may be implemented using Function Control Protocol (FCP) as defined by IEC 61883, or any other appropriate protocol. Thus, a network may generally include two or more devices interconnected by a physical layer exchange or transfer of data in accordance with a predefined communication protocol.

Each client device 12 may communicate with one or more server devices 14 in the network 10. Further, each server device 14 may communicate with one or more other server devices 14, and one or more client devices 12, in the network 10. Each client device 12 can include a user communication interface including input devices such as a mouse and keyboard for receiving user input, and a display for providing a control user interface for a user to interact with the networked devices. The user interface can include a graphical user interface (GUI) 18 for providing information to the user. Each server device 14 includes hardware as a resource in the network for providing services to the user, and can further include a server or service control program 20 for controlling the server hardware.

Each server device 14 provides a service for the user, except control user interface, and each client device 12 provides a service including control user interface for user interaction with the network 10. As such, only client devices 12 interact directly with users, and server devices 14 interact only with client devices 12 and other server devices 14. Example services can include MPEG sourcing/sinking and display services.

In an exemplary embodiment of the present invention, a browser based network (e.g., a home network) uses Internet technology to control and command devices including client devices and server devices that are connected to a network. Each device includes device information such as interface data (e.g. HTML, XML, JAVA, JAVASCRIPT, GIF, JPEG, graphics files, or any other format useful for the intended purpose) that provides an interface for commanding and controlling of the device over the network. In certain embodiments, each device includes device information such as one or more Hypertext markup Language (HTML) pages that provide for the commanding and controlling of that device. Using the browser technology, the network employs Internet standards to render the HTML pages in order to provide users with a plurality of graphical user interface (GUIs) for commanding and controlling each device. In one example, the network is configured as an intranet.

In one embodiment, a client device comprises a device providing control interface service to a human operator, including a graphical display hardware for down communication and a mouse or other point-and-click device for up (or return) communication. A server device comprises a module supplying a service, which can be any service other than a control interface provided by a client device. As such, the server/client device relationship is a control relationship, wherein the server device provides a service but a client device can use the data, as a DTV displays video data, but need not manipulate or alter the data. It is thus consistent with this definition to observe that, frequently, a server may be a source of information and a client (a browser, for example) may be a consumer of information.

Examples of specific functions which can be implemented by server devices include: return of information (data); performance of a function (e.g., mechanical function) and return of status; return of a data steam and status; reception of a data stream and return of status; or saving of a state for subsequent action. Examples of server devices include MPEG source, sink and display servers. While a server device typically includes a custom, built-in, control program to implement control of its own hardware, a client functions to interface with the server device. However, server device as used herein does not imply that a web server and a protocol stack must be used.

Figure 2:
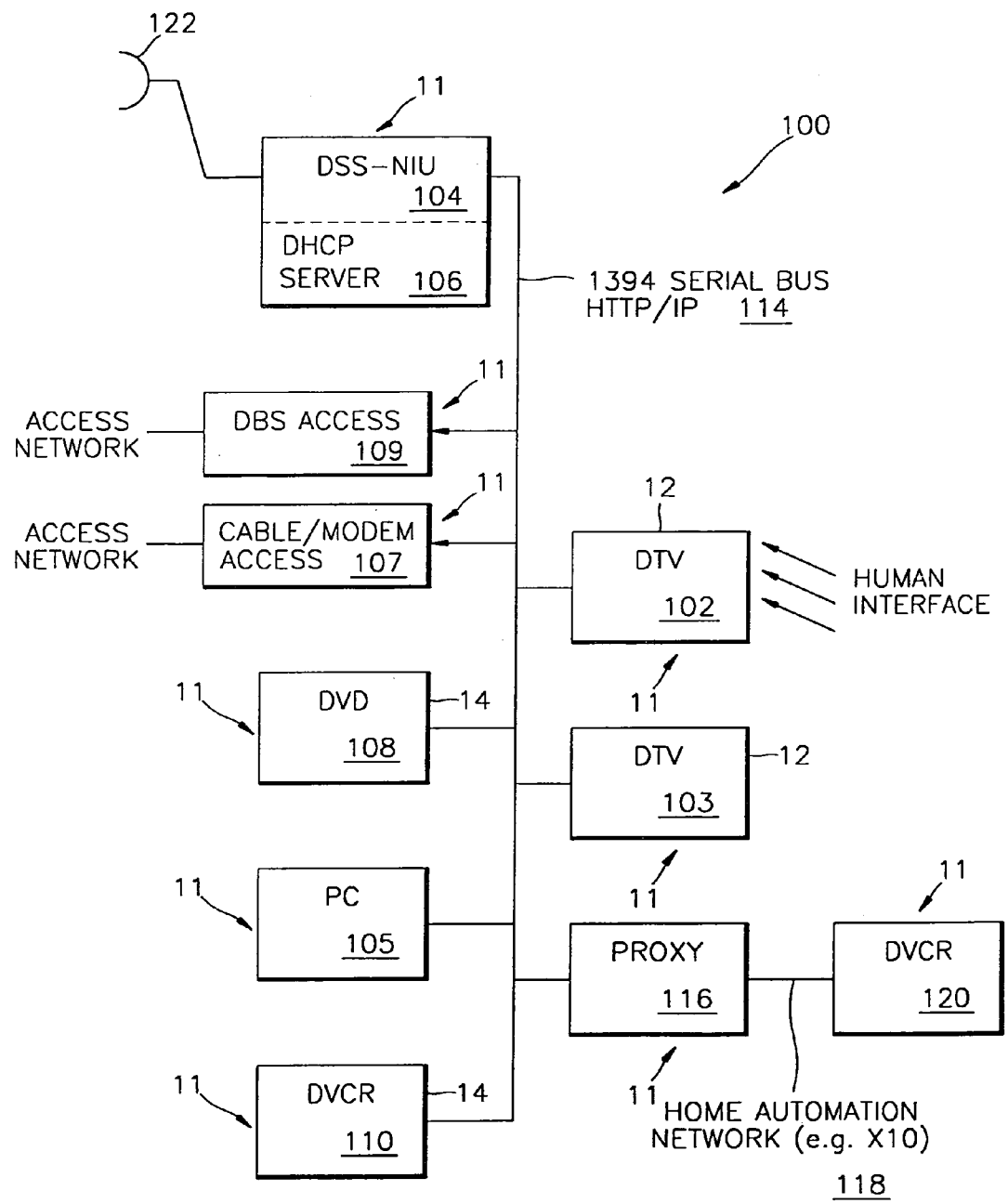
FIG. 2 shows an example block diagram of the architecture another embodiment of a network according to the present invention.
Figure 3:
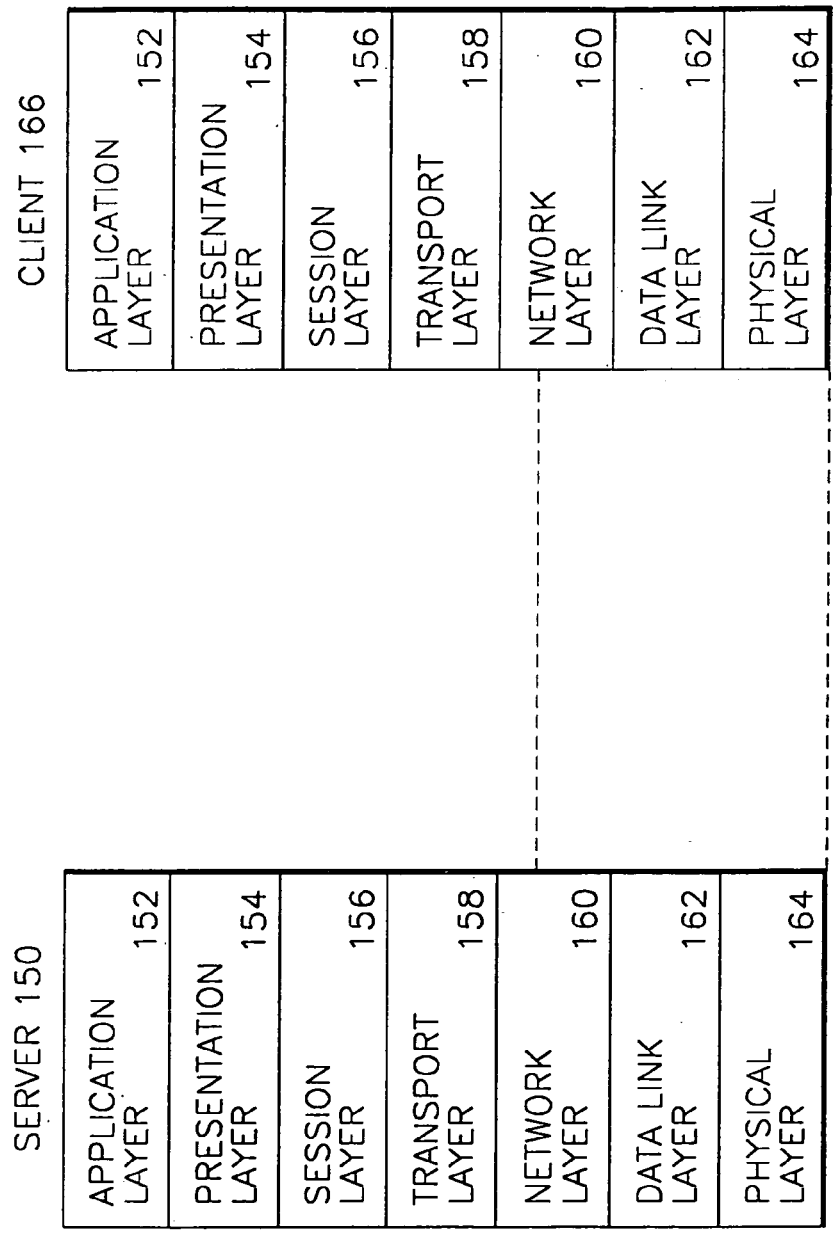
FIG. 3 illustrates an example of a layered interface model that can be used for communicating between home devices in accordance with the present invention.

FIG. 2 shows a block diagram of an embodiment of a network 100 according to an aspect of the present invention. A 1394 serial bus 114, described above, electronically connects multiple devices 11 including server devices 14 (e.g., DVD 108, DVCR 110), client devices 12 (e.g., DTV 102, 103), Bridge 116, DVCR 120, PC 105, cable/modem access 107, and DBS access 109, on the network 100. FIG. 3 illustrates an example of a layered interface model that can be used for communicating between the devices 11 in accordance with the present invention. In this example, a device (server) 150 communicates with a client device 166 using one or more of the network communication layers 152–164. In one example, an application in the device 150 communicates with an application in the device 166 via the network layer 160. The details of lower layers 162 and 164 are not seen by the applications, whereby use of e.g. either 1394 or Ethernet does not make a difference to said applications in the devices 150, 166. Further not all the upper layers of the 7-layer model are used all the time (e.g., in the Web model (TCP/IP model) session layer 156 and presentation layer 154 are not used). As such, in one version, by employing the Internet Protocol standard for the network layer 160, the devices can communicate with each other without having to know specific details about the other communication layers (i.e. application 152, presentation 154, session 156, transport 158, data link 162 and physical 164). Thus, by employing the Internet Protocol standard for the network layer 160, the network can use a combination of different communication layers in communicating between different devices.

A single physical package can include several devices which are logically networked via a network layer for example as shown in FIG. 3 not necessarily via a physical network (e.g., such devices can include a VCR and a TV in a single housing). Where a logical device accesses a GUI to enable a user to control a device, the device and the logical device can be included in the same physical package. In such an embodiment, the physical device fetches a GUI from itself. However, in other embodiments the network interconnects separate physical devices, wherein for example, a first device fetches a GUI from a second device, to permit user interaction with the GUI to control the second device.

In a presently preferred embodiment, a 1394 serial bus is used as the physical layer 164 for the data communications on the network 100. Because of its enhanced bandwidth capabilities (e.g., enhanced and guaranteed bandwidth and isochronous stream capability), the 1394 serial bus can provide a single medium for all data communications on the network 100 (i.e. audio/video streams and command/control).

Further, the 1394 serial bus provides automatic configuration reset such that when a device is plugged in/removed all the 1394 interfaces reset, the 1394 bus reconfigures and every device knows the presence of every other device (including a newly added one or without the one just removed). Also, the 1394 interface supports a data space for configuration information that is addressable from any device allowing other devices to write/read information and make modifications e.g. to permit the operation of the network layer protocol. However, it is possible to achieve these results with different software and standards. As such, the network 100 is not restricted to using a 1394 serial bus, and, in alternative embodiments of the present invention, other bus types, such a Ethernet, ATM, wireless, etc., can be used as the physical layer if they meet the particular throughput requirements of an individual network (e.g., a home network). Further, a modified version of e.g. wireless-Ethernet can include the essential features of 1394.

As depicted in FIG. 2, the network 100 includes several devices connected to the 1394 serial bus 114. In this example, the devices include a DBSS 104 for receiving transmission signal from a satellite 122 for subsequent display. Associated with the DBSS is a network interface unit ("NIU") which, among other things, provides an interface between the DBSS satellite transmission and the 1394 serial bus 114.

A digital video device (DVD) 108 is also connected to the exemplary network 100. The DVD 108 can be used to display digitally encoded videos on a television. Also connected to the exemplary network 100 is a digital video cassette recorder (DVCR) 110, i.e., a digital TV 102. In this example, the DTV 102 provides a human interface for the network 100 by employing browser technology to allow users to control and command for devices over the home network 100. A second DTV 103 provides another human interface for the network 100 by employing browser technology to allow users to control and command for devices over the home network 100. The DTVs 102 and 103 can provide human interfaces for the network 100 as each DTV comprises a screen for displaying HTML pages. However other devices having display capability can be used to provide human interfaces. Thus, in certain embodiments of the invention, a device such as the personal computer 105 (PC) is used to provide a human interface for a respective home network, as a PC 105 typically embodies a screen display unit.

The 1394 serial bus 114 is depicted as using the HTTP/IP interface protocol, and preferably HTTP/TCP/IP, wherein IP provides packet format (a one-way write only model), TCP provides an error free version of IP (e.g., ensures packets arrive and in correct order), and HTTP provides 2-wa connection (packet to server will expect a response—a 'read' model). Certain devices can require other protocol interface types (e.g., UPD/IP, FTP/IP, TELNET/IP, SNMP/IP, DNS/IP, SMTP/IP). In certain embodiments of the invention, a proxy 116 can be used to interface two networks using dissimilar interface protocols on their respective mediums which, when connected, comprise the network 100. The proxy 116 (e.g. Web proxy) can include Home Automation type protocols such as the HTML/HTTP/TCP/IP proxy for X10, Lonworks, CEBus (on their respective physical technologies), or non-IP protocols on 1394 (e.g., AVC/FCP/1394).

In certain embodiments, the two network mediums are of the same type. For example, as depicted in FIG. 2, the 1394 serial bus 114 using the HTTP/IP interface protocol is connected by a proxy 116 to the Home Automation neutral 118 (e.g., X10). By using the proxy 116 as HTML/HTTP/CTP/IP/1394 proxy for VCR-Commands/AVC/FCP/1394, to interface between HTML/HTTP/TCP/IP and X10 protocols, DVCR 120 is also accessible on the network 100. In certain other embodiments, a network can comprise two network mediums of dissimilar types, e.g., a 1394 Serial bus and Ethernet. Therefore, in certain embodiments of the invention, a proxy is used to interface two dissimilar medium types to from a single network. A discovery process, described further below, can be used for the discovery of devices that are powered on and connected to the network 100. Also, the same 1394 bus can be used without need for a bridge box.

As depicted in FIG. 2, devices 11 including DTV 102, DTV 103, PC 105, DVCR 110, DVD 108, DSS-NIU 104 and DVCR 120 represent devices that are currently connected to the network 100 comprising a 1394 network. A client-server relationship exists among the attached devices, with the DTV 102, DTV 103 and PC 105 typically behaving as clients and devices DVCR 110, DVD 108, DSS-NIU 104 and DVCR 120 behaving as servers.

A typical 1394 network comprises interconnected devices such as a collection of appliances including server devices offering one or more services to be controlled (e.g., DVCR 100 as an MPEG video recording and replay service), and client device offering a user interface (UI) service (e.g., DTV 102) for controlling the server devices. Some appliances (e.g., DTV 103) can have both services (e.g., MPEG decode and display capability) to be controlled, and a UI controller capability. According to an aspect of the present invention, methods and systems including protocols, document description, image compression and scripting language standards from technologies utilized in the World Wide Web standard (Web model) are used to implement t a 1394WEB user-to-device control model in the network 100. The Web model is a client/server model. The controlled server device (service) comprises a Web server and the controller client device (i.e., a device capable of displaying a UI) comprises a Web client including a GUI presentation engine, described further below, such as a Web browser (e.g., Explorer™, Netscape™, etc.).

User Device Control

Figure 4A:
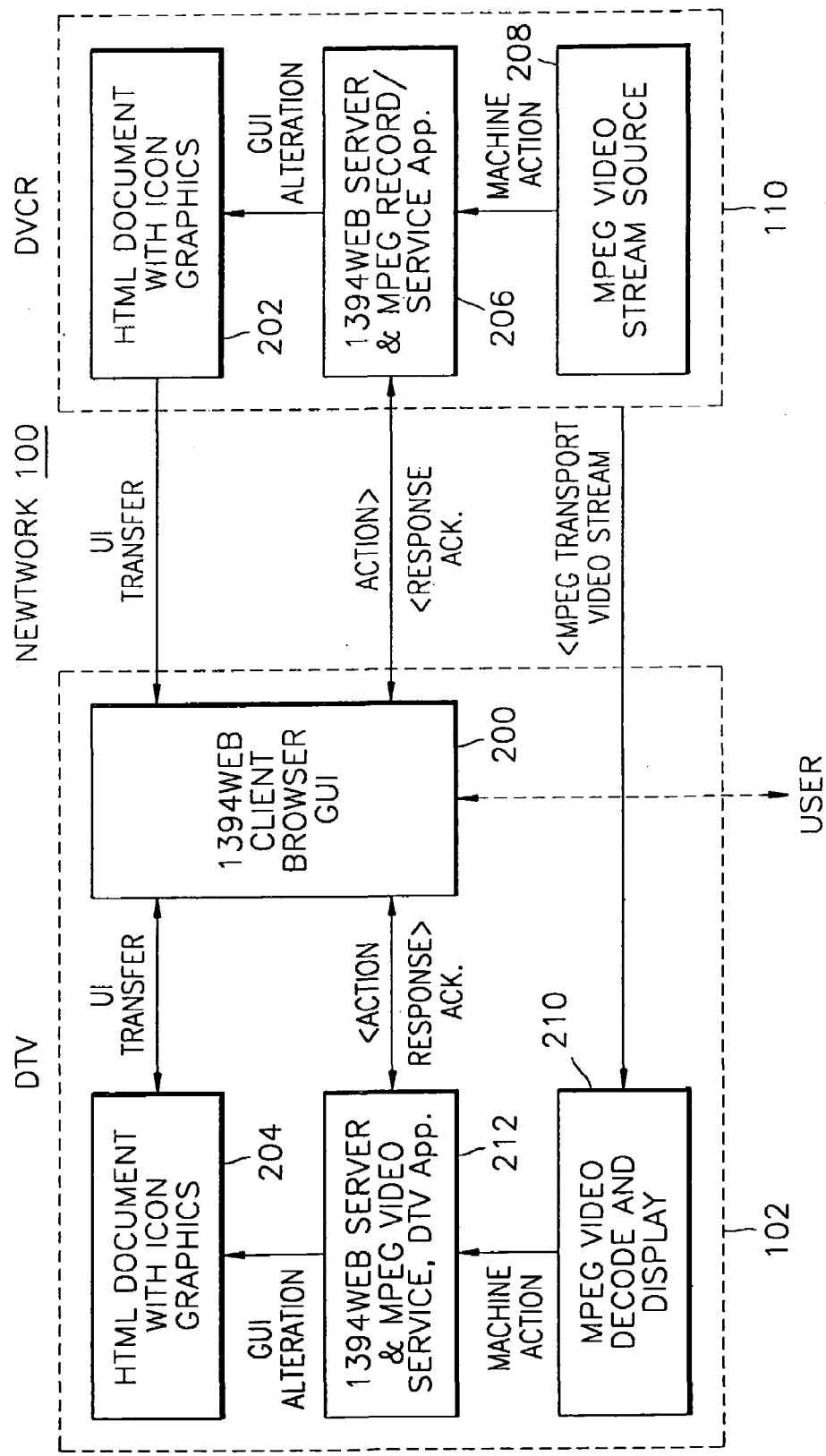
FIG. 4a shows an example architecture diagram of a DVCR server device replaying video to a DTV client device capable of displaying a user interface, in a network according to the present invention.

FIG. 4a shows a server device such as the DVCR 110 replaying MPEG video to a client device such as the DTV 102 in a network 100 according to the present invention, wherein the DTV 102 can display a user interface. The DVCR 110 includes Web server hardware and software and the DTV 102 includes Web browser software. A user can utilize the DTV 102 to request that the DTV 102 display a user interface based on the device information 202 contained in the DVCR 110 or based on the device information 204 contained in the DTV 102. For example, the user can utilize a browser 200 in the DTV 102 to display an HTML control page GUI 202 contained in the DVCR 110 or an HTML control page GUI 204 contained in the DTV 102. Each page 202, 204 includes graphical user interface description information in HTML, wherein the browser 200 reads that information to generate a graphical user interface. Each page 202, 204 represents the Control Interface of the Applications 206, 212, respectively. Each page 202, 204 can include a hierarchy of pages to represent a corresponding application control interface.

Each GUI 202 and/or 204 includes active control icons and/or buttons for the user to select and control devices currently connected to the network 100. If, for example, the user selects a PLAY button in the GUI 202 of the DVCR 110 displayed by the browser 200 on the DTV 102, a hyperlink message is returned to the DVCR 110 Web server and directed to an application software 206 (e.g., MPEG Record/Replay Service Application Software) in the DVCR 110 for operating a DVCR hardware 208. In one example, an MPEG video stream source 208 in the DVCR 110 transmits an MPEG video stream to an MPEG vide decode and display system 210 in the DTV 102 for display under the control of application control software 212 in the DTV 102. The application software 206 in the DVCR 110 also sends information back to the application software 212 in the DTV 102, including e.g. an acknowledgement if the operation is successful, or an altered or different control GUI 202 to the DTV 102 indicating status to the user. There can be further communication between the application softwares 206 and 212 e.g. for setting up a 1394 isochronous video stream connection for video stream service.

Figure 4B:
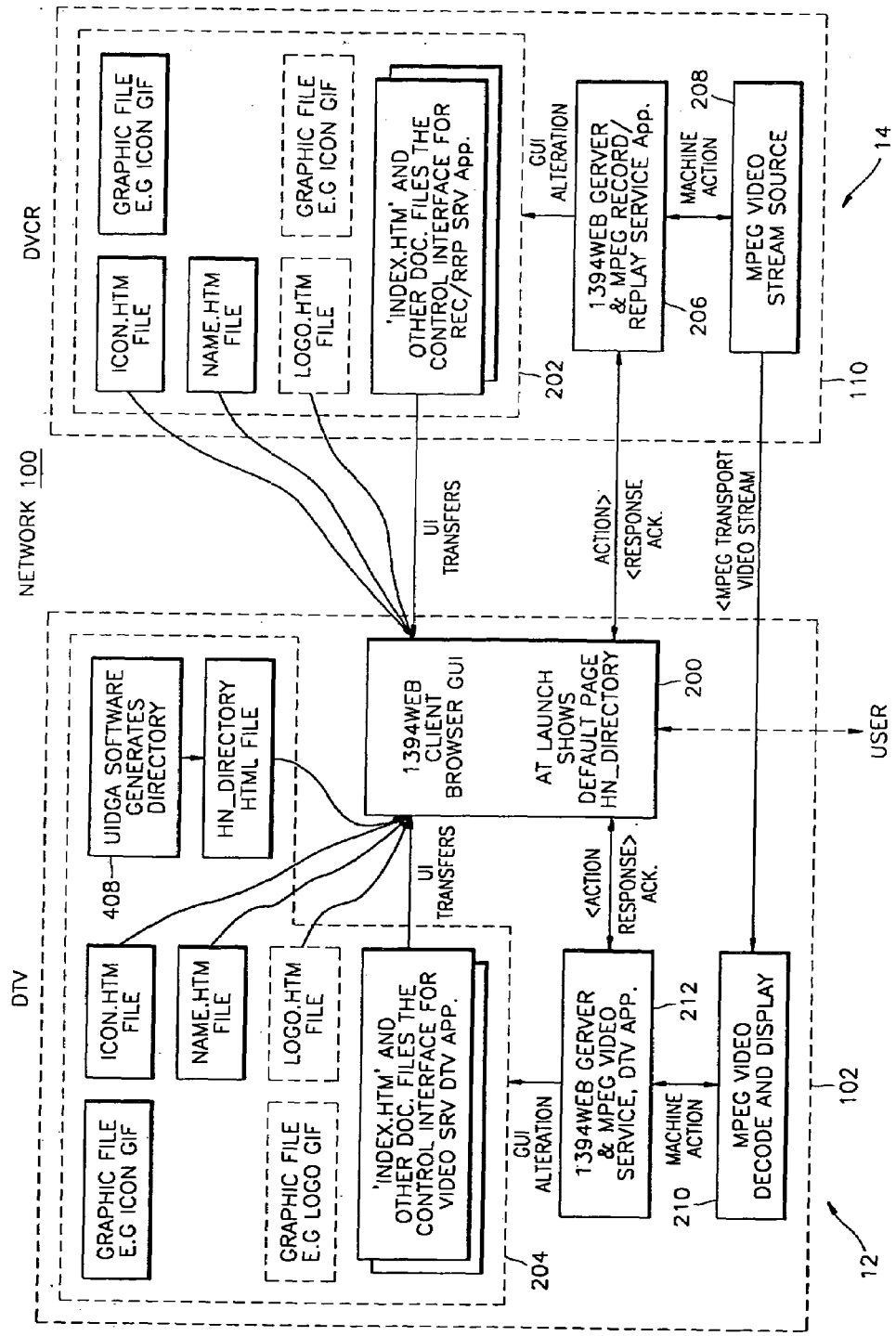
FIG. 4b shows another example architecture diagram of a server device communicating with a client device capable of displaying a user interface, in a network according to the present invention.

FIG. 4*b* shows another example architecture diagram of a server device communicating with a client device capable of displaying a user interface, in a network 100. The server device such as DVCR 110 replays MPEG video to the client device such as the DTV 102 in the network 100, wherein the DTV 102 can display a user interface.

Communication Protocol

In an embodiment of the invention, the communication protocol between devices in the network 100 is based on the Hypertext Transfer Protocol (HTTP 1.1), an application-level protocol for distributed, collaborative, hypermedia information systems. HTTP is a generic, stateless, object-oriented protocol that can be use for many tasks. A feature of HTTP is the typing and negotiation of data representation, allowing devices to be built independently of the data being transferred over the network 100 to which the devices are connected.

GUI Description Language

The description document language for defining various GUIs 202, 204 can be e.g. HTML, version 4.0, the publishing language of the World Wide Web. HTML supports text, multimedia, and hyperlink features, scripting languages and style sheets. HTML 4.0 is an SGML application conforming to International Standard ISO 8879—Standard Generalized Markup Language.

Image Compression Formats

To display images, three still image graphics compression formats specified by the HTML specification are utilized in the 1394WEB network 100 for ICON, LOGO and other graphics. The still image graphics compression formats are: Graphics Interchange Format (GIF89s), Progressive Joint Photographic Experts Group (JPEG) and Portable Network Graphics (PNG). Table 1 shows the differences in capabilities between the three different still image graphics compression formats.

TABLE I

Still Image Compression Formats

| | PNG | Progressive JPEG | GIF89a |
|---|---|---|---|
| Color Depth | 48 bit | 24 bit | 8 bit |
| Colors Supported | | 16.7 million | 256 |
| Formats Supported | Raster, Vector | Raster | Raster |
| Compression Scheme | LZ77 derivative | JPEG | LZW |
| Transparency | Per Pixel for Grayscale & RGB, Per Color for Indexed, 256 levels | No | Single Color, 2 levels (Binary) |
| Progressive Display | Yes | Yes | Yes |
| Scalable | No | No | No |
| Animation | | No | Yes |

TABLE I-continued

Still Image Compression Formats

| | PNG | Progressive JPEG | GIF89a |
|---|---|---|---|
| Lossless Compression | 100% | | |
| Truecolor | 48 bits | | |
| Grayscale | 16 bits | | |
| Indexed-color | yes | | |
| Gamma Correction (light intensity) | Yes | | |
| Chromaticity Correction | Both | | |
| Searchable Meta-Data | Yes | | |
| Extensibility | Yes, chunk encoded | | |

Scripting Language

Further, the Web scripting language, ECMA-Script-262, is utilized to provide a means for visually enhancing the GUI Web pages 202 as part of a Web-based client-server architecture. The scripting language is a programming language for manipulating, customizing, and automating the facilities/services of the devices. The user interface 200 provides basic user interaction functions, and the scripting language is utilized to expose that functionality to program control. The existing system provides the host environment of objects and facilities completing the capabilities of the scripting language. The web browser 200 provides the ECMA-Script host environment for client-side computation including, for example, objects that represent windows, menus, pop-ups, dialog boxes, text areas, anchors, frames, history, cookies, and input/output.

The web browser 200 provides the host environment for the EXMA-Script-262, and the host environment supports attaching scripting code to events such as change of focus, page and image loading, unloading, error and abort, selection, form submission, and mouse actions. Scripting code is included within the HTML pages 202 and 204 and the displayed page is the browser 200 includes a combination of user interface elements, and fixed and computed text and images. The scripting code responds to user interaction without need for a main program.

Client Device Specification

In one example, the specification for a 1394WEB client browser 200 includes HTTP1.1 specification, wherein section '8.1.2.1 Negotiation' of the HTTP1.1 specification regarding connection persistence is modified such that an HTTP1.1 client device such as e.g. the DTV 102 expects a connection to server device such as e.g. the DVCR 110 via the 1394 to remain open, because the persistent connection in 1394WEB user control allows full status reporting from the server device (DVCR 110) while the GUI 202 and/or 204 remains visible in the browser 200 of the client device (DTV 102). The HTTP connection remains open (HTTP spec RFC 2068) wherein a client that supports persistent connections may "pipeline" its requests (i.e., send multiple requests without waiting for each response). A server must send its responses to those requests in the same order that the requests were received. This allows the web browser 200 to pipeline requests to the DVCR 110 which the DVCR 110 can then satisfy later with e.g. status responses such as Now Playing, Now Recording, Rewind Finished, Tape Broken, Etc. Other example implementations include e.g. the control page from the DVCR 110 can contain a request to loop on the DVCR 100 request of GUI description 202.

The GUI presentation engine 200 is utilized in the client device such as the DTV 102 to interpret GUI descriptions 202, 204 written in the HTML4.0 document description language and the associated specifications (below), and to create the graphical form for display to the user. The GUI presentation engine 200 includes the following e.g. attributes: (1) window (GUI) minimum default size of e.g., H0x640 pixels (480×640 where 480 vertical, 640 horizontal). This default size is to insure the intended appearance in the GUIs 202, 204 is transferred to the user in the browser 200. The transferred GUIs 202, 204 are displayed in a window 480×640 pixels or magnified larger with the same aspect ratio unless otherwise directed by the user; (2) still image compression formats: e.g., GIF89a, JPEG, and PNG; (3) style sheet formats and fonts: e.g., CSS1 and CSS2; (4) fonts such as the following e.g. built-in fonts are required for the client device to free simple server appliances from having to support such fonts. Minimum one font from each generic Latin family can be selected: e.g., Times New Roman, from 'serif' family; Helvetica, from 'sans-serif' family; Zapf-Chancery, from 'cursive' family; Western from 'fantasy' family; and Courier from 'monospace' family. Other fonts can also be utilized; and (5) scripting language e.g., ECMA-262. Examples of the GUI presentation engine 200 include Web browsers such as Explorer™ and Netscape™ configured/customized as desired.

Server Device Specification

One or more of the server devices (e.g. a 1394WEB network, controlled appliance Web server such as the DVCR 110), include the following six enumerated components:

(1) HTTP1.1 web server protocol, with section '8.1.2.1 Negotiation' of the HTTP1.1 specification regarding connection modified such that an HTTP1.1 server device (e.g. DVCR 110) assumes that a HTTP1.1 client device (e.g., DTV 102) intends to maintain a persistent connection with the server device. The persistent connection in the 1394WEB network 100 allows full status reporting from e.g. the server device DVCR 110 to the client device DTV 102 while the GUI 202 of the DVCR 110 remains visible in the browser 200 of the DTV 102. Further, a method using HTTP conditional GET to obtain the latest status of server devices can be used. Whenever the user returns to the home network directory or causes it to be refreshed, the browser 200 redisplays the page in its entirety. This is necessary because the HTML that underlies the home network directory may have been regenerated if a device has been added to or removed from the network 100. It is also possible for device icons to be updated to reflect changes in their device's operating state. As such, browsers implemented by EIA-775.1 devices utilize HTTP "conditional get" requests to determine whether or not fresh copies of web pages or graphics should be retrieved from the server.

(2) Device home page GUI descriptions 202, 204 written e.g. in HTML4.0, include file e.g. icon.htm, name.htm, logo.htm, index.htm, gif files, etc. The file index.htm is referenced by HTML links included in device icon.htm and name.htm HTML files, wherein index.htm can be optionally named e.g. "INDEX.HTML" or "INDEX.HTM". File named INDEX.HTM is not required to be a standard name because the ICON.HTM and NAME.HTM are made with hyperlinks to the 'INDEX.HTM', therefore the name is arbitrary. ICON.HTM and LOGO.HTM reference the actual graphics files in the same device e.g. LOGO.GIF and ICON.GIF. The descriptions 202, 204 are accessible by the devices (e.g., HTTP devices) in the network 100. To guarantee a desired appearance, the control GUI design can be for a default GUI size of e.g. 480×640 pixels. For example, a transferred GUI 202 can be displayed in a window of 480×640 pixels in the browser 200 or magnified larger with the same aspect ratio unless otherwise directed by the user.

(3) At least two device ICON files are provided to represent the device in a top-level network page 220 (FIGS. 5–6) in the browser 200 showing information about the devices connected to the network. An ICON can comprise a graphic file type (e.g. GIF, JPG or PNG) and named ICON.HTM. In one example, ICON.HTM(DVCR) references the INDEX.HTM file in the HTML page 202 and ICON.HTM(DTV) references the INDEX.HTM file in the HTML page 204. The top-level link for the control pages (e.g., INDEX.HTM) of the device can be ICON.HTM. The browser 200 places the icons and links therein) of a plurality of devices in the network 100 in the top-level HN directory page 220 for service discovery by the user. Then user clicks the ICON displayed in the page 220 and the device page (e.g. INDEX.HTM in page 202) is fetched. The default displayed HN directory is the top-level discovery page.

A number of additional and different graphic icons can also be utilized, for example, to represent device status, user configured preference or manufacturers formats which may be substituted for the icon graphic. In a discovery process described further below, ICONs from the devices connected to the network 100 are collected together and displayed in the top level network devices page 220 for selection by a user. An example device ICON specification comprises: File name ICON.HTM accessible by the HTTP server (files names are in a directory, file space, accessible by the web server so that they can be retrieved and forwarded over the network to the browser); Graphic file type such as GIF, JPG or PNG; and Icon graphic with a maximum size of 70(V)×130(H) pixels.

(4) At least two device LOGO files are provided to represent the device in the top-level network devices page. LOGO can comprise a graphic file type (e.g., GIF, JPG or PNG) and named LOGO.HTM. In one example, LOGO.HTM(DVCR) references the INDEX.HTM in the HTML page 202 and LOGO.HTM(DTV) references the INDEX.HTM in the HTML page 204. In one version, the top-level link for the control pages (e.g., INDEX.HTM) of the device can be LOGO.HTM. All device logos are placed in the top-level HN directory page 220 for service discovery by the user. Then user clicks the LOGO displayed in the page 220 and the device page (e.g. 202) is fetched. A number of additional and different graphics for manufacturer services can be substituted for the logo graphic format. According to the discovery process, LOGOs from devices connected to the network 100 are collected together and displayed in the top level network devices page 220 for selection by a user. An example device LOGO specification comprises: File name LOGO.HTM accessible by the HTTP server; Graphic file type such as GIF, JPG or PNG; and logo graphic maximum size of about 70(V)×130(H) pixels.

(5) At least one device NAME is provided to represent the device in the top-level network devices page. NAME comprises TEXT in an HTML file NAME.HTM. This text can also reference control pages (e.g., 202). This is a top-level link in the discovery page to the control interface of the device. The text provides a way to distinguish identical devices whereby for e.g. two identical DTV's can be distinguished by adding NAME text 'Bedroom TV' and 'Family Room TV'. The text can comprise a few words to clearly represent the device type e.g. DVCR or DTV. According to the discovery process, NAMEs from devices connected to the network are accessed along with corresponding ICONs/LOGOs and displayed in the top level network devices page 220 under the ICON/LOGO. An example NAME specification comprises: File name NAME.HTM accessible by the HTTP server; Text unspecified, such as, with Font size 10, two lines of text can be displayed under the corresponding ICON/LOGO. Therefore, for example the space size for the NAME.HTM text can be 20 vertical by 130 horizontal to match the ICON/LOGO (70 vertical×130 horizontal). As shown by example in FIGS. 5–6, the format of the top-level UI 220 can comprise a matrix of icons representing the functions of the networked devices to the user. The name representing the device (from name.htm) is placed under the icon (from icon.htm) from the same device. Logo (from logo.htm) may be placed e.g. in any vacant icon position. As the Top-level description 250 (described further below in conjunction with FIGS. 9*a*–*c*) is generated independently by UI capable devices, the exact design need not be prearranged. The icon, logo and name maximum sizes can be prearranges to facilitate design of the GUI matrix.

(6) A device information summary home page description document written in HTML4.0 can be provided, named e.g. "info.html" or "info.htm", and made accessible by the HTTP server for the discovery process. A link can be provided to INFO.HTM information via control pages e.g. 202, 204. The device information summary homepage provides the user a device summary instead of the detailed control interface as shown in the device homepage. Table 2 shows device attributes text that are included and others that can be included. This table can be extended to included other attributes.

TABLE 2

Device Information Summary

| Name | Value |
| --- | --- |
| Device Name | Device name (user configurable) |
| Device Location | Device location in home (user configurable) |
| Device Icon | Current Device ICON name |
| Device Type | Device type or category (VCR, DSS, TV, etc.) |
| Device Model | Device model |
| Manufacturer Name | Name of device manufacturer |
| Manufacturer Logo | Manufacturer Logo image name |
| Manufacturer URL | Device manufacturer's URL |
| Stream Source Name Default | Service: Default source device name for this Device's destination service |
| Stream Destination Name Default | Service: Default destination device name for this Device's source service |
| Stream Source Attributes | Type of service device can deliver (attributes and capability) |
| Stream Destination Attributes | Type of service device can receive (attributes and capability) |

Table 2 includes device summary information such as Manufacturer Name, Manufacturer Logo image name, and can further include a Manufacturer URL for help if there is an available Internet connection to the manufacturers Web site. Table 2 can further include a user configurable Device Name and Device Location in the home. There can be several variations of the Device Icon representing different states of the device. The Device Icon attribute field includes the name of the current icon. Therefore, the device summary information page can provide immediate device state information to the user by displaying the icon representative of current state.

Each device can include one or more services, e.g. video Stream Source or video Stream Destination. Each source capability has a complementing Default Destination capability and each destination capability has a complementing Default Source capability. This Stream Default Name entry can be used e.g. to automatically default the nearest DTV to be the destination when a DVCR is being controlled as source to eliminate having to select the DTV each time. A background cross-referencing of the Stream Default Name to 1394 address is provided. The video stream services are provided by the 1394 interface itself (not by Web model). As such there is a linkage of the default source or sink to the 1394 address mechanism. The user can access a device and select a name for default, which is then saved on the device. The device's software agent must find the 1394 address and parameters for the 1394 s/w to enable the default stream when required.

Using the Source and Destination service attributes, new server/services can be implemented while maintaining compatibility with existing host or device (nodes) and services. For example, if a new server device providing a new service is developed that is compatible with an existing server device, both the new and existing servers can be added to the attribute list of the new node while maintaining compatibility with existing nodes using the existing server in the network 100. The user can select a compatible device for purchase. These provide a user with "ABOUT" information to check capabilities of existing equipment e.g. prior to purchasing new equipment where compatibility is desired.

Network Operation

A discovery process for every device supporting the 1394WEB standard (e.g. devices capable of displaying a user interface) gathers device information from devices connected to the network 100 to generate the top-level user control page description for the home network, wherein each device is represented by a graphical icon reference and a textual name reference detailed above. The top-level description can include a default page for a presentation engine such as the browser 200, wherein the browser 200 collects the graphic images and names from the devices as it renders the network top-level graphical user interface 220 (GUI) displayed in the browser 200 as shown by example in FIGS. 5–6. The dynamically created top-level HN directory page 220 is made the default page for the browser (first page displayed when the browser is launched).

With reference to FIG. 4*b*, example operation steps include: (1) the browser 200 in device 102 is launched, (2) the browser 200 fetches and presents HN-Directory HTM (Top-Level UI) from the page 204, (3) the browser 200 fetches the HTM files icon.htm and names.htm from pages 202, 204 and presents in the Top-Level UI, (4) the browser 200 fetches any graphics files (e.g., GIF) from pages 202, 204, and presents in Top-Level UI, (5) the browser 200 is then able to present the full HN_Directory page 220 (page 220 is made with hyperlinks to 'INDEX.HTM' files for different devices connected to the network 100), and (6) when a user clicks e.g. DVCR icon in GUI 220 to control the DVCR 110, a corresponding hyperlink in the top-level page 220 to 'INDEX.HTM' of the DVCR 110 is used to retrieve the 'INDEX.HTM' (top control page of DVCR) from page 202 in the DVCR 110, and present the DVCR control page to the user (e.g., if the frame that was clicked (e.g. the icon.htm frame) is not large enough, a graphic is presented in another copy of the browser with full frame size). The user can then command and control the DVCR 110 using the control interface provided by 'INDEX.HTM' of the DVCR device 110 presented by the browser 200 in the DTV 102

The name 'INDEX.HTM' is arbitrary because the ICON.HTM and NAME.HTM are made with hyperlinks to the 'INDEX.HTM'. However, ICON.HTM and LOGO.HTM reference the actual graphics files (e.g. LOGO.GIF and ICON.GIF) in the same devices. In one embodiment, LOGO.HTM can be optional if a logo for a device is optional. The HN_Directory HTML file can have a standard name so that it can be accessed from another device.

Figure 5:
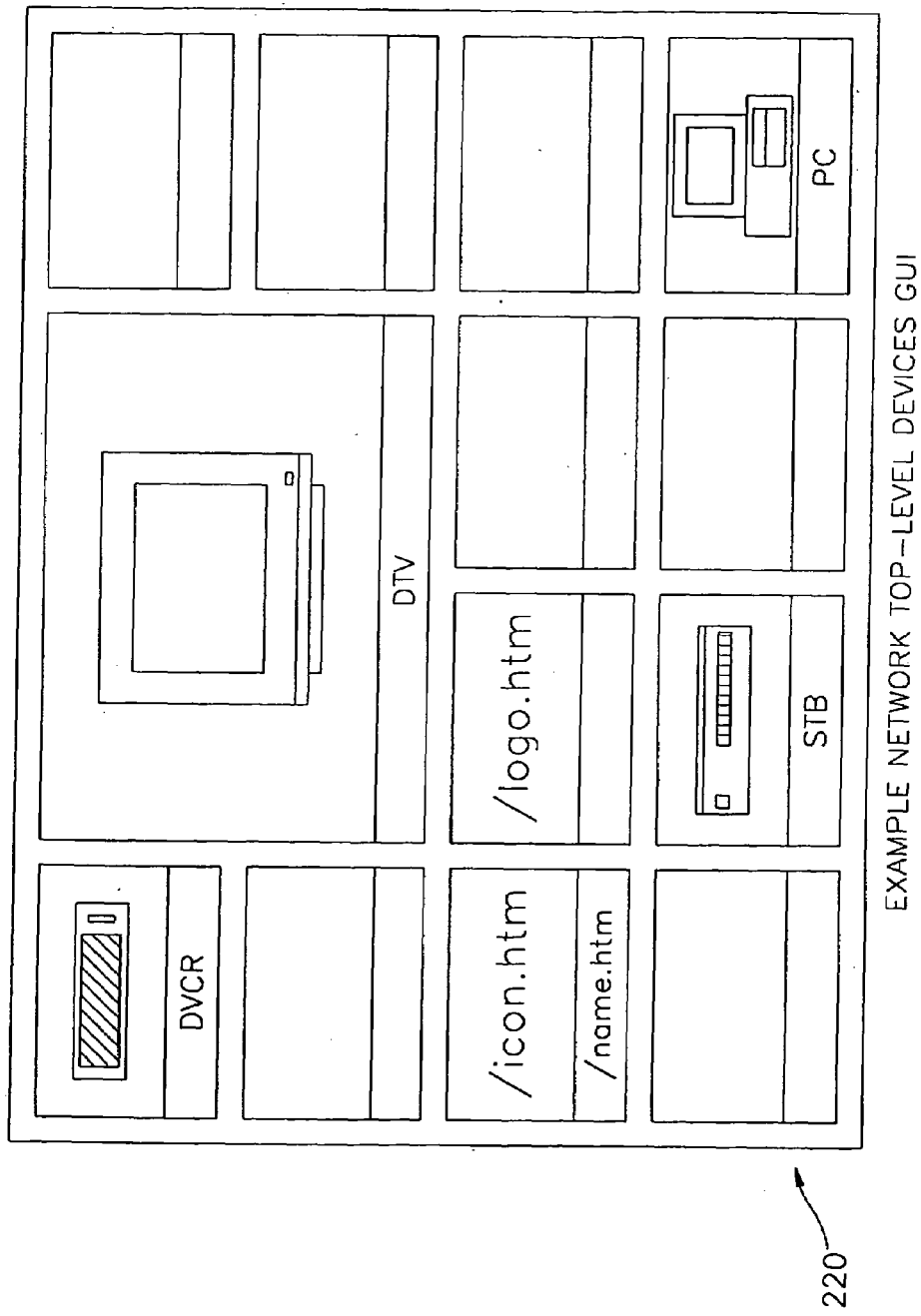
FIGS. 5–6 illustrate example top-level GUIs representing the functions of networked devices to a user.
Figure 6:
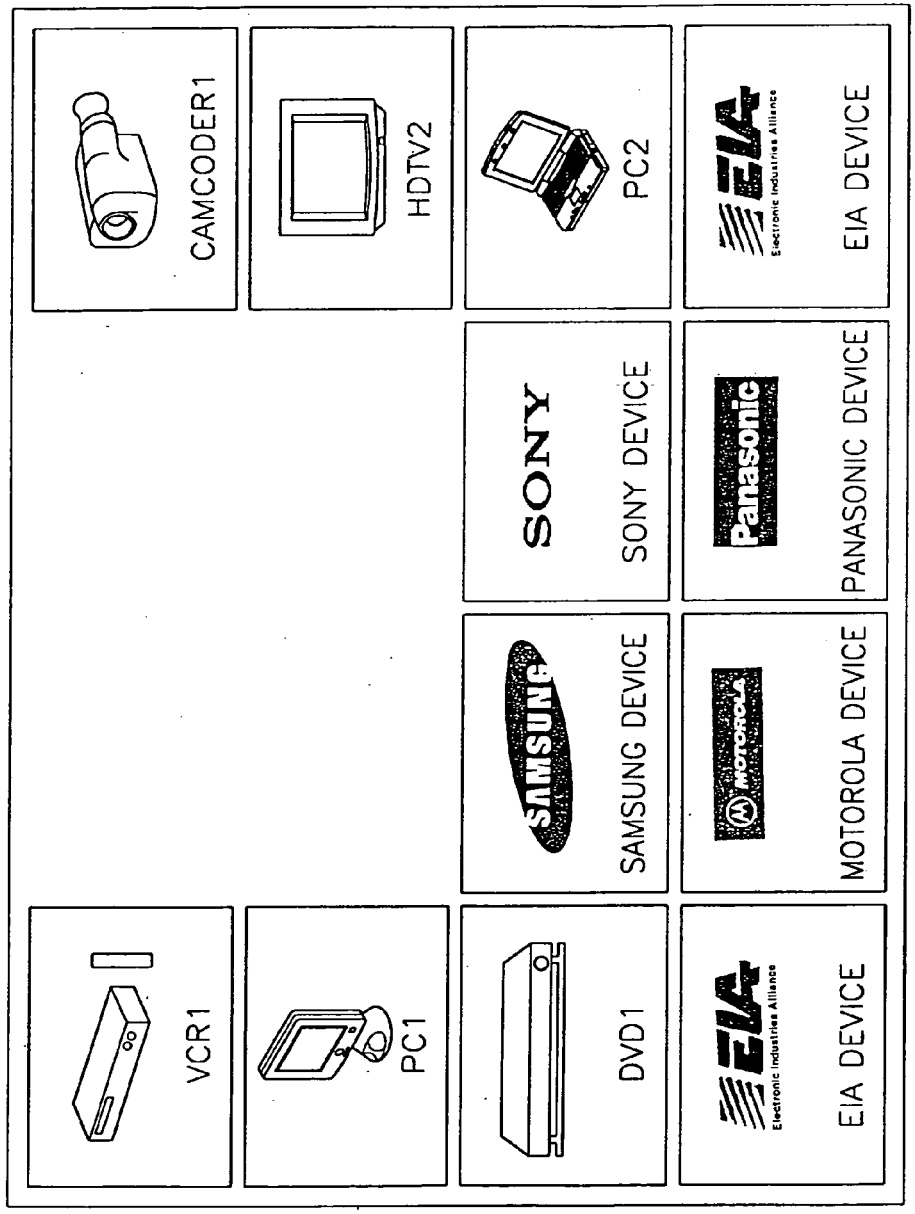

FIGS. 5–6 show that the host device, such as a client device (e.g., DTV 102, HDTV1) or server device (e.g., DVCR 110) that generates and presents the top-level GUI page 220 can assume priority and use a larger size icon for the host device's icon, name, logo, etc. In one version, only devices with servers (services on offer) are displayed in the GUI 220 (a "Client device" comprises device with Client capability, where if it is only client then it is not displayed in the top-level GUI as there is no service to offer). The discovery process reads information from the 1394 address space data storage (configuration ROM structure), as defined in clause 8 of ISO/IEC 13213. Although called 'ROM' it is assumed that the address space is write-able to allow user configuration and modification of user relevant stored values. The contents of the configuration ROM and the discovery process are described further below.

Device naming, addressing and discovery processes for home or local network control of consumer devices using Internet, Web and 1394 technology, can be different from the requirements and practice in the general Internet space. As such according to an aspect of the present invention for in home or local network control of consumer devices, special processes including device discovery, addressing and naming requirements are utilized. For example, the home network must fully function without the presence of external communications and services, without a network administrator, and configuration must be fully automatic. User control can be in many cases entirely keyboard-less. Further, the IEEE1394 protocol is utilized to provide a sophisticated interface including features that can be provide simple, efficient and superior discovery and configuration functions.

1394 Home Network

Figure 7:
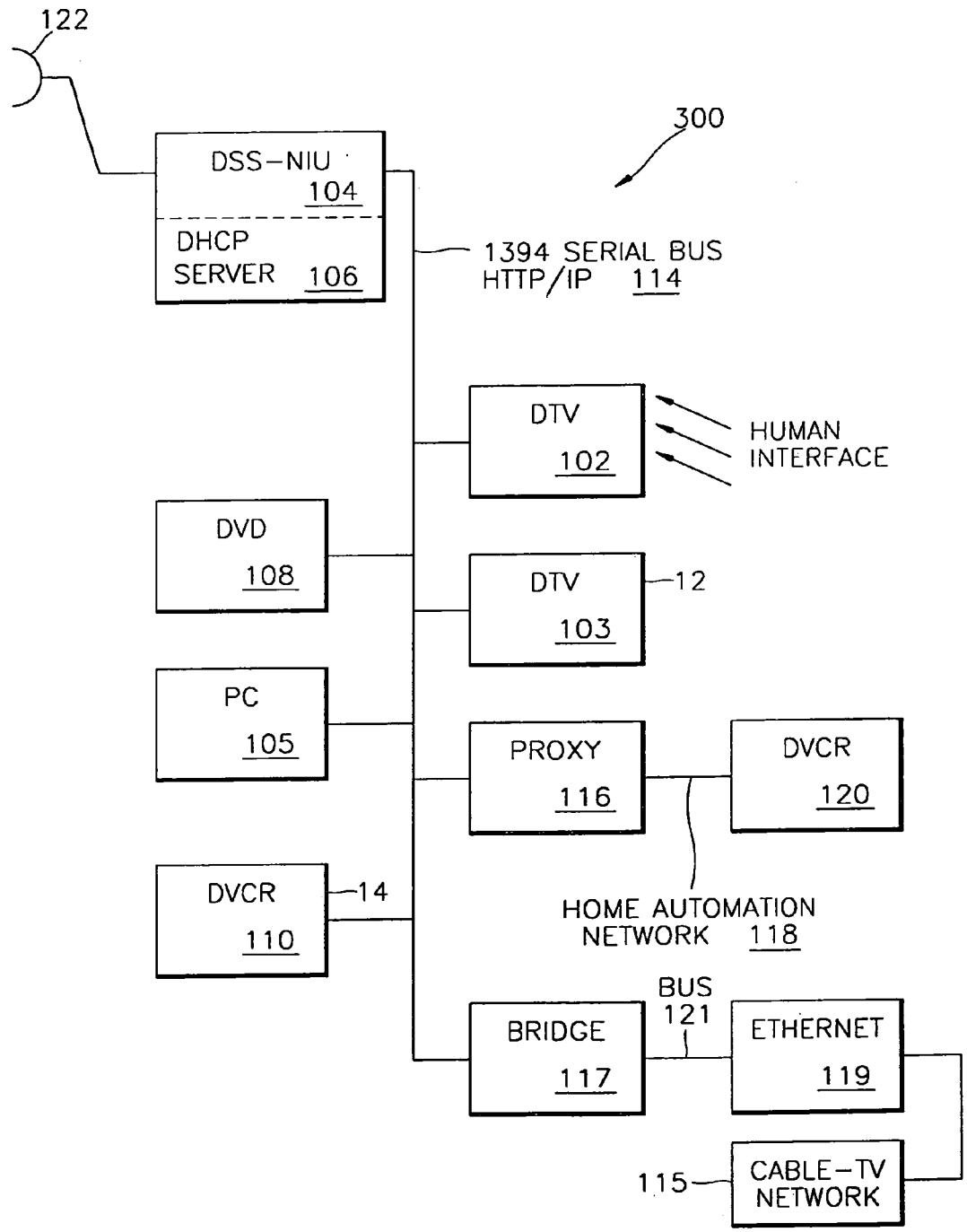
FIG. 7 shows an example block diagram architecture of a home network constructed in accordance with another embodiment of the present invention.

FIG. 7 shows a block diagram of a network 300 constructed in accordance with another embodiment of the present invention. To facilitate understanding, identical reference numerals have been used, where possible, to designate identical elements that are common throughout all the figures herein. As depicted in FIG. 7, a 1394 serial bus 114, described above, electronically connects multiple devices including server devices 14 (e.g., DVD 108, DVCR 110) and client devices 12 (e.g., DTV 102) on the network 100, described above in reference to FIG. 2, wherein the devices communicate using the example layered interface model of FIG. 3 as described above.

The network 300 is not restricted to using a 1394 serial bus, and, in alternative embodiments of the present invention, other bus types, such a Ethernet, ATM wireless, etc., can be used as the physical layer if they meet the particular throughput requirements of an individual network (e.g., a home network). As depicted in FIG. 7, the network 300 includes several devices connected to the 1394 serial bus 114. In this example, the devices include a DBSS 104 for receiving transmission signal from a satellite 122 for subsequent display. Associated with the DBSS is a network interface unit ("NIU") which, among other things, provides an interface between the DBSS satellite transmission and the 1394 serial bus 114. A digital video device (DVD) 108 is also connected to the exemplary network 300. The DVD 108 can be used to source digitally encoded videos for display on e.g. a digital television. Also connected to the exemplary network 100 is a digital video cassette recorder (DVCR) 110, a digital TV (DTV) 102. In this example, the DTV 102 provides a human interface for the network 300 by employing browser technology to allow users to control and command for devices over the home network 300. A second DTV 103 provides another human interface for the network 100 by employing browser technology to allow users to control and command for devices over the home network 100. The DTVs 102 and 103 can provide human interfaces for the network 300 as each DTV comprises a screen for displaying HTML pages. However other devices having display capability can be used to provide human interfaces. Thus, in certain embodiments of the invention, a device such as a personal computer 105 (PC) is used to provide a human interface for a respective home network, as a PC 105 typically embodies a screen display unit.

The 1394 serial bus 114 is depicted as using the HTTP/IP interface protocol, and preferably HHTP/TCP/IP, wherein IP provides packet format (a one-way write only model), TCP provides an error free version of IP (e.g., ensures packets arrive and in correct order), and HTTP provides 2-wa connection (packet to server will expect a response—a 'read' model). Certain devices can require other protocol interface types (e.g., TCP/IP, UPD/IP, FTP/IP, TELNET/IP, SNMP/IP, DNS/IP, SMTP/IP). In certain embodiments of the invention, a proxy 116 can be used to interface two networks using dissimilar interface protocols on their respective mediums which, when connected, comprise the network 300.

For example, as depicted in FIG. 7, the 1394 serial bus 114 using the HTTP/IP interface protocol is connected by a proxy 116 to the Home Automation network 118 (e.g., X10). By using the proxy 116 as HTML/HTTP/CTP/IP/1394 proxy for VCR-Commands/AVC/FCP/1394, to interface between HTML/HTTP/TCP/IP and X10 protocols, DVCR 120 is also accessible on the network 300.

In this embodiment, the network 300 can be connected to an external network 119 of dissimilar type (e.g., Ethernet) to the 1394 Serial bus, via a bus 121. A proxy 117 is used to interface the two dissimilar medium types. For communication between the addressing scheme of the external network 119, and the addressing scheme of the network 300, the bridge 117 comprises a Network Address Translation (NAT) boundary. This technique can be utilized for company LAN's and is a 'divide and conquer' approach to the complex problem of satisfying various network's differing IP address requirements and prevents 'running out of IPV4' addresses. The external network can include e.g. CABLE-TV network 115 via Ethernet to the telephone e.g. ADSL), providing broadband connection to the Internet and WWW. The Ethernet 119 provides the bridge function to the external network. The bridge 117 or Ethernet 119 may provide the NAT address conversion function. If the Ethernet is to provide local private (to home only) addressing (e.g. as defined by then IETF standard RFC 1918) then the NAT function is in the Ethernet 119. Existing cable modems are set up with a global address and also Internet global address for the PC on the Ethernet (in this case the NAT is in the bridge 117).

IP Name/Address Configuration

The aforementioned device naming, addressing and discovery processes for the network 300 are now described. For device naming, point and click Web operation (e.g., using GUI/Web) does not require name services (DNS, Domain Name Service). The Web GUI provides an abstraction layer, and the addresses are hidden as hyper-text links invoked by user 'clicks' to active GUI areas (e.g., buttons). Any change to the devices in the local network 300 causes the top-level discovery GUI page 200 (FIGS. 5–6) to be recreated by the browser 200 (FIGS. 4a–b) representing the status of the devices in the network 300 at that time and by default presented to the user for immediate use.

For device to device control a different look-up service is utilized for more than names (e.g., service look-up and application look-up). As such, DNS may not provide the necessary features for device to device control. However, a device (e.g., a 1394 connected PC) can access a DNS service as usual. DNS is not required for discovery or operation of devices/services within the home, but DNS (name to address) look-up service is required for external accesses e.g. from a PC. When a name e.g. "www.yahoo.com" is typed in to a Browser then look up take place for the IP address of the Yahoo computer, i.e. 216.32.74.52, because the Internet (even home internet) operates with addresses.

For a 775WEB UI device which includes an agent for generating the HN top-level directory GUI description and also includes access to the special company web server e.g. homewideweb.com (IP address), can also have the DNS address knowledge. The DNS server computer IP address can be any IP address under the control of the manufacturer. Effectively the DNS address is built-in to the device (or can be updated if the agent is made to be update-able and is later updated).

For device addressing, in one embodiment of the invention, utilizing fixed IP addresses from a large address space can afford the simplest and most reliable network configuration, and the readily accessible ROM data space in the 1394 interface allows utilization of fixed IP addresses therein. In another embodiment of the invention, non-fixed IP (dynamic) addresses can be utilized, wherein an abstraction layer (e.g., name or look-up mechanism) is employed to retain pre-organized communications For IP address configuration, the following protocols can be utilized: (1) Dynamic Host Configuration Protocol (DHCP) with DHCP servers and DHCP clients, (2) DHCP clients resort to auto-configuration (DHCP server not present), and (3) preferably, FWHCP (Fire-Wire Host Configuration Protocol) server agent(s) and FWHCP clients, described further below. The auto-configuration in (2) above is that proposed as an IETF Draft "draft-ieff-dhc-ipv4-autoconfig-04.txt".

DHCP requires support of the BOOTP/UDP protocol, and replicates what is done within the 1394 specification and provides features such as lease time and dynamic addressing. Typical DHCP requires management by an administrator and must be configured and adapted to the network requirements of mass manufactured consumer electronics (CE) appliances where, for example, multiple identical CE appliances with DHCP server built-ins must be considered.

The 1394 technology provides 'Plug-in' or 'Power-up' reset and following 'Self-ID' sequences, well suited for network configuration. Further, the 1394 specification provides a built-in 'ROM' address space well suited for storage of, and access to, configuration data (e.g., IP addresses). As such, in a preferred embodiment of the invention, an IP address configuration agent (FWHCP) and discovery page for user control of 1394 devices are utilized. FWHCP provides IP address configuration for 1394WEB and 1394 devices. The purpose and result of FWHCP is similar to DHCP (i.e., a server to identify and assign the local IP addresses), but in operation FWHCP uses data in 1394-address space and 1394 commands. FWHCP provides IP address configuration of 1394WEB devices on the 1394 network avoiding collisions with devices on adjacent attached networks other than 1394. Devices are manufactured with a built-in IP address from the 10.x.x.x range. In the unlikely event of a collision, FWHCP sets a new IP address and saves it in the device.

DHCP/Auto-configuration can be utilized for devices on networks other than 1394. DHCP protocol provides client "requested IP address". Preferably, the requested IP address space is selected from the upper part of the 24 bit RFC1918 range (10.128.1.1 to 10.254.254.254). By choosing part of the allowed private address range for 1394 IP addresses and another part for other configuration methods (e.g., DHCP and DHCP/Auto-Configuration) then compatible and non-interfering addresses are generated for a heterogeneous network and allow FWHCP and DHCP to coexist.

While choice of non-overlapping IP addresses for 1394 and adjacent networks is desirable, the heterogeneous network using FWHCP will configure successfully even if they do overlap. Also, DHCP clients check their assigned IP address with a test ARP message before using it. As such, different address configuration methods can coexist successfully.

Network Scenarios and Address Management

Figure 8:
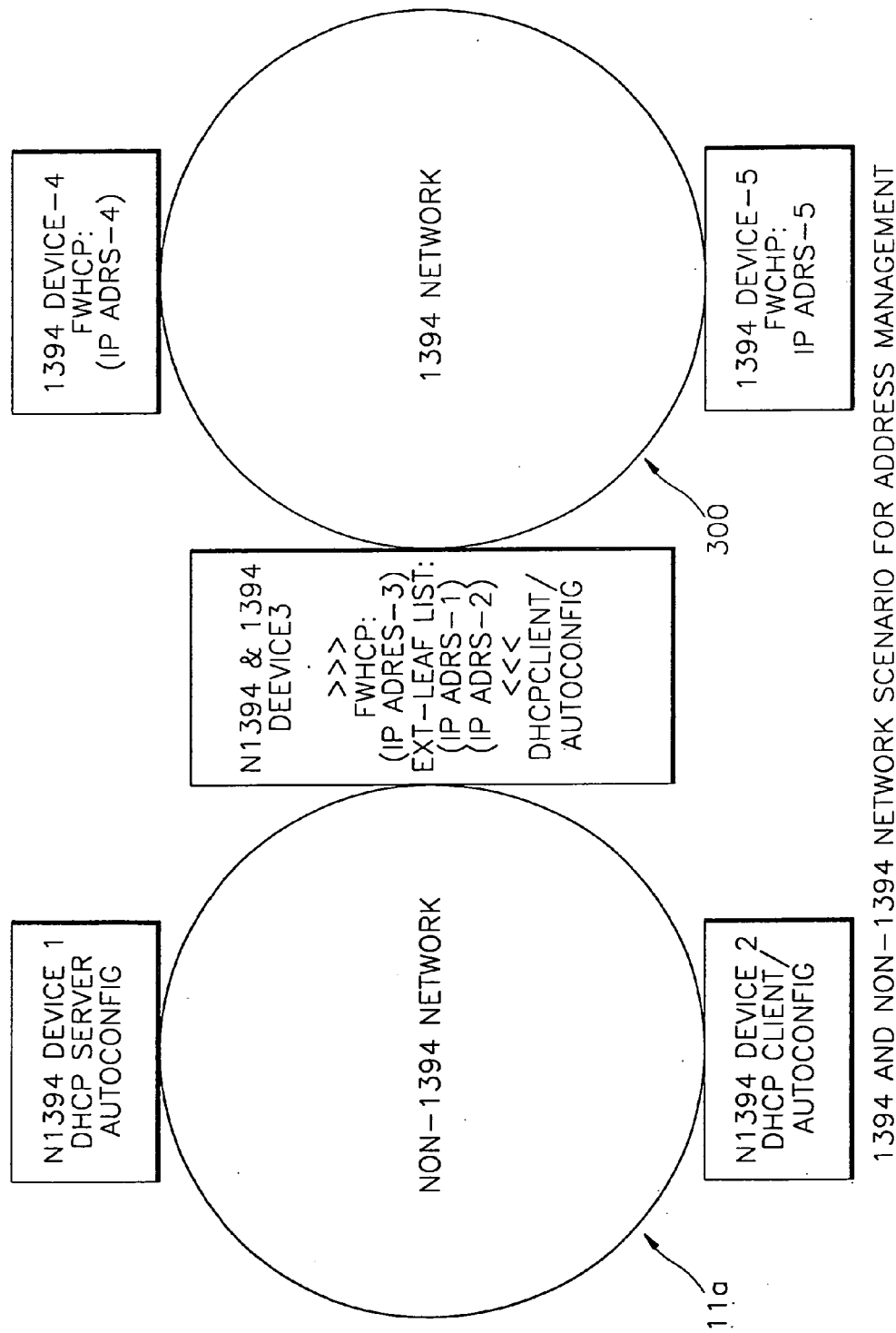
FIG. 8 shows an example process according to the present invention for communication between a 1394 network and a non-1394 network for IP address configuration.

Referring to FIG. 8, an example process according to the present invention for communication between a 1394 network (e.g., network 300) and a non-1394 network (e.g., Ethernet 119) for IP address configuration is described. In this case the 1394 network 300 utilizes FWHCP configuration and the non-1394 network 119 utilizes DHCP configuration or other method. Generally, 1394 devices (such as DTV and DVCR in FIG. 7) do not support DHCP. The 1394 DEVICE-3, for 1394 network to non-1394 network communication, includes an IP address in the 1394 ROM space and provides support for FWHCP for a 1394 device. The DEVICE-3 further includes means for supporting the configuration mechanisms on the non-1394 network, and maintains an extension data leaf in the 1394 ROM space for IP addresses of devices on the non-1394 network. As such, configuration processes (e.g., FWHCP for top-level UI description generation) on the 1394 network 300 can include use of IP addresses on the non-1394 network by selecting IP addresses from the extension data leaf. The non-1394 network configuration operates to provide the IP addresses for the 1394 extension data leaf.

According to the discovery process (agent), 1394 specification 'plug-in' reset and self-ID is utilized for configuration and can be used for IP address configuration. Preferably, fixed IP addressing is utilized for home networks, however dynamic IP addressing can also be utilized. DNS is not required within 1394WEB control because a top-level GUI description is created with hypertext-links that use IP addresses rather than names. Preferably, the IP configuration agent (FWHCP) for the 1394 network is utilized for IP configuration using 1394 ROM data and 1394 commands, however DHCP can also be utilized. FWHCP utilizes lower half of RFC1918 10.LH.X.X addresses and other home networks (not 1394) use upper half 10.UH.X.X. Preferably, the FWHCP server agent is built-in to any device that can be a client (control initiator). Where there are several client devices connected to the 1394 network, only the client device with the highest Global Unique Identification (GUID) operates. GUID comprises a number built-in to the interface. If there are multiple FWHCP agents available on the 1394WEB network then there is an initial self-election process to determine the one that will operate and all others remain quiet. The highest GUID will operate. In other versions, highest bit-reversed-GUID can be used.

A device interfacing to a non-1394 network supports a ROM extension leaf of IP addresses on the non-1394 network. This allows inclusion of the IP addresses on the non-1394 network in the 1394 top-level GUIs (e.g., FIGS. 4a–b, GUIs 202, 204). Control data bits in the 1394 ROM space are used to control the operation of three configuration agents: (1) 1394 Self_ID count, (2) IP configuration FWHCP, and (3) UI description generation described further below.

Initially 1394 Self-ID count discovers the existence of devices. After a bus reset (caused by power up/down or device attachment/detachment) 1394 software in the device observes the automatic configuration process (1394 self-ID cycles) for the purpose of counting the number devices. This is a normal part of 1394 software for any 1394 device. Then, IP Configuration FWHCP (the one self-elected FWHCP) probes the discovered devices and checks their built-in IP address. Discovered duplicate (colliding) IP addresses are disabled and a new address is assigned to the device. Then, UI description generation agent (UI or other devices), reads all 1394WEB device IP addresses and generates a top-level device directory Graphic User Interface file in HTML of top-level icon pages from each device later rendered by a Web browser for User discovery of devices for control.

Figure 9C:
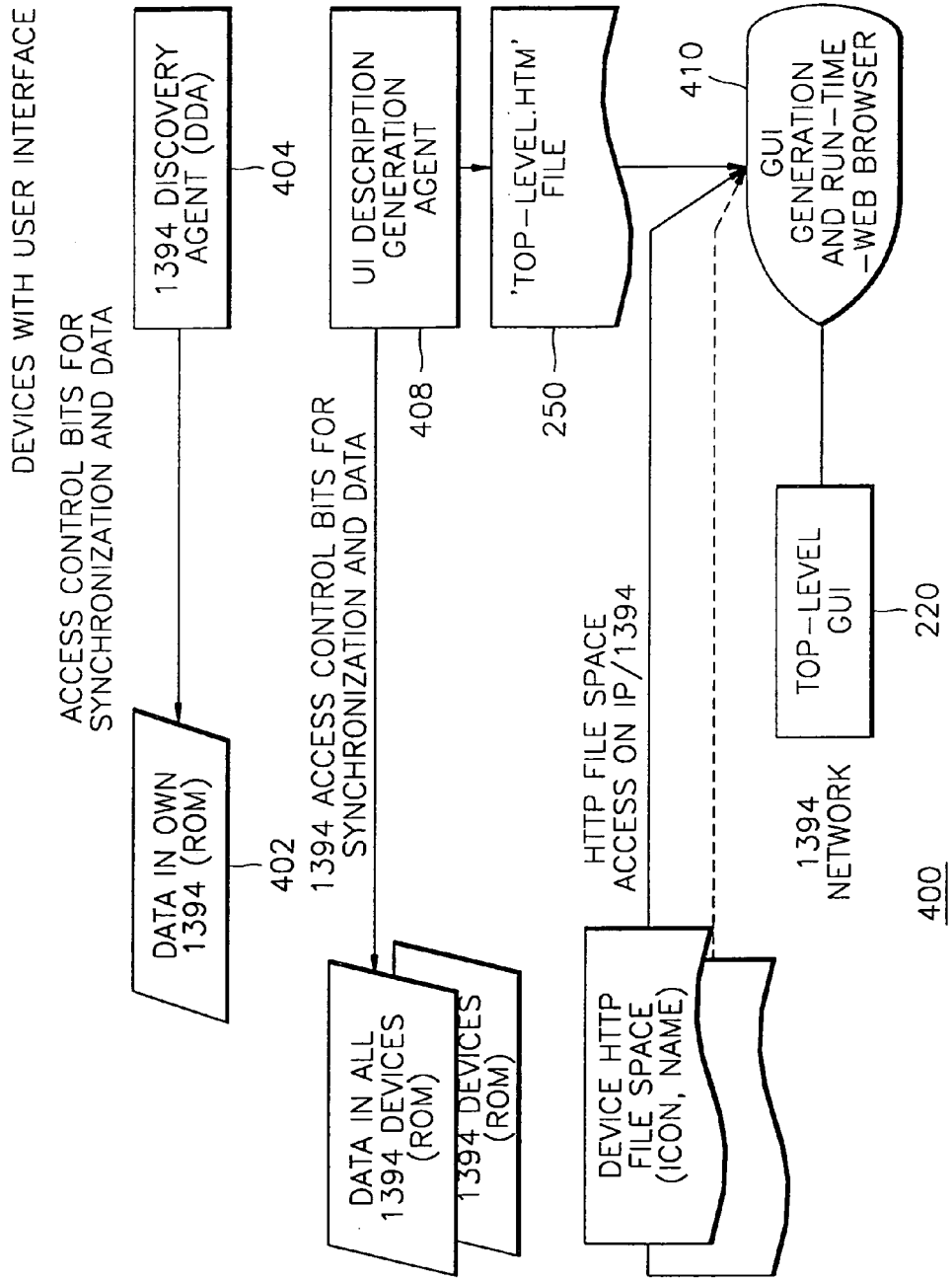

According to the present invention each device in the 1394 network 400 can generate its own top-level network UI description 250 (FIG. 9c). The UI description 250 is used by a presentation engine such as the browser 200 in a client device to generate and display a top level directory page such as page 220 in FIGS. 5–6. After the 1394 Self-ID agent has enumerated all devices connected to the 1394 network 300, the top-level UI description 250 is generated separately by all UI devices (and non-UI devices as desired). A device (e.g., DTV) can select a more prominent (e.g., larger) icon to represent that device, and make the entire GUI 220 with a different look. This technique provides substantially more reliable operation than a centrally generated GUI for operation of all device, because each device can generate its own UI description 250 and display a GUI (e.g., top level page 220) based thereon without dependence on another device. In each UI description 250, device icon and logo image files of the devices currently connected to the network 300 are referenced by icon and logo HTML 'pages' and name text wrapped in an HTML page (ICON. 'Graphic' referenced ICON.HTM is in pages 202 and 204 which also include the control pages for the device; FIG. 5 below also shows the ICON.HTM, LOGO.HTM and NAME.HTM in a top-level directory page). HTML frames are used to create the top-level directory UI description 250 for network devices in each network device as desired.

As such, advantageously, a useful layer of abstraction is provided to allow use of alternative file names and types for e.g. identification graphics in the network devices without need for change in the top-level description 250 generated in each device. The name text is also placed in an HTML description 202, 204 (NAME.HTM is in pages 202, 204), allowing a user to configure the name text at a device e.g. DTV to change to e.g., DTV-BED2 through one of the device GUI pages 220. As such, the page 220 is displayed as the Browser is launched after a reset. The user sees and clicks DVCR ICON graphic, whereby DVCR top level control GUI 202 is fetched (with 'Play' button etc.). User clicks one of the buttons e.g. "Configure Device NAME" which is another GUI (of hierarchy of control pages for DVCR) with a large selection of different names.

User clicks one name out of the lists of names provided e.g. "Master Bedroom DVCR".

Software on the device changes the file names so that the file named NAME.HTM contains the text "Master Bedroom DVCR" (the old default NAME.HTM file that contained DVCR is changed to some other name).

Appearance of the GUI 220 is more stable in the event of 'bad citizen' devices having too much or oversized text or oversized logos. In this case the frames isolate the problem and prevent the bad items from adversely affecting the appearance of the entire top-level GUI 220.

Device Discovery Architecture

Referring to FIGS. 9a–c, 10, 11 example functional blocks and connections to data and control bits and flowchart of an embodiment of a system architecture 400 for the aforementioned discovery process are shown. The system 400 comprises five primary elements: (1) 1394 non-volatile memory space (IEEE1212R ROM) 402 for configuration data and control data bit storage; (2) 1394 Device Discovery Agent (1394DDA) 404; (3) IP Address Configuration Agent (FWHCP) 406; (4) UI Description Generation Agent 408; and (5) GUI Generation and run-time environment 410 (e.g., Web Browser 200 in FIG. 2). Further, FIG. 10 shows an example flow diagram for the DDA and FWHCP agents in system 400 operating in connection with the functional blocks in FIGS. 9a–c. And, FIG. 10 shows an example flow diagram for the UIDGA agent in system 400 operating in connection with the functional blocks in FIGS. 9a–c.

Referring to FIGS. 9a and 10 all devices include the 1394 device discovery agent (1394DDA) 404 to enumerate the devices on the 1394 bus, after a reset, and to write the value into the local 1394 ROM space 402 for communicating the value to other functional agents (steps 500, 502). For synchronizing (inhibiting) commencement of other configuration agents, the 1394DDA agent 404 also sets the 'configuration operating' control bits. The discovery agent/mechanism can use means, other than the ROM space, to communicate information between the configuration agents that are local to one device and where the information does not need to be seen by other devices.

1394 ROM Data in All Devices

All devices in the network 300 include the following information relevant to the discovery and IP address agents 404 and 406, respectively, for the 1394WEB in the 1394 configuration ROM 402: (1) Built-in 64 bit GUID (Global Unique ID, in 1394 specification); (2) Built-in IP address from the RFC 1918 private address space in the range '10.1.1.1' to '10.127.254.254'. Manufacturers can select a value from the GUID such that chance of collision is minimized. The upper portion of the private address space (i.e., 10.128.1.1 to 10.254.254.254) is reserved for devices on bridged networks; (3) Assigned IP address in the range '10.1.1.1' to '10.127.254.254' (assigned by operating FWHCP agent 406); (4) IP address extension leaf for IP devices on bridged networks; (5) Assigned Count of 1394 devices (assigned by 1394DDA agent 404); (6) Control/status bits to indicate Configuration-in-Progress Synchronization control for 1394 Device Discovery Agent 404, and to indicate IP-Address configuration (The control bits indicate the configuration is in progress and therefore the values, in ROM data other than the control bits, for 1394DDA and IP address are not checked or not written and therefore should not be used). The bits further indicate which IP address is valid (assigned or built-in), and whether an FWHCP server agent 406 is present in the device; (7) HTTP web server to allow files in the device's file space to be accessed remotely; and (8) device information 202, 204 including actual 'icon', 'name' and 'logo' HTML files and other referenced graphic files accessible through the Web Server. The above summarized information is detailed in the 1394 ROM space description below.

IEEE 1212 Configuration ROM

The content of the general 1394ROM structure 402 is specified in IEEE1212r, IEEE1212 and IEC61883. The ROM structure 402 is a hierarchy of information blocks, wherein the blocks higher in the hierarchy point to the blocks beneath them. The location of the initial blocks is fixed while other entries are vendor dependent, but can be specified by entries within the higher blocks.

Table 3 shows the Bus_Info_Block and Root_Directory of the configuration ROM 402. The first byte of each entry is known as a key and identifies the type of entry. The following can be implemented in the configuration ROM of all devices making use of the EIA-775 specifications, including display devices such as DTVs and source devices such as DVCRs, STBs, etc. There may be several other structures required based on other protocols to which each device conforms. Table 3 includes information for a device which also complies with the IEC61883 protocol. The Root_directory contains pointers to a Model_Directory and three Unit_Directory entries (IEC61883, EIA-775 and 1394WEB), to indicate that the device supports EIA-775 as well as 1394WEB protocols. The Root directory entries are useful to other 1394 devices to discover the protocols and software (also called services) supported by this 1394 device.

TABLE 3

Configuration ROM
Offset (Base address FFFF F000 0000)
Bus_info_block

| Offset | | | | | |
|---|---|---|---|---|---|
| 04 00$_{16}$ | 4 | crc_length | rom_crc_value | | |
| 04 04$_{16}$ | "1394" | | | | |
| 04 08$_{16}$ | flags | reserved | cyc_clk_a | max_rec | reserve |
| 04 0C$_{16}$ | node_vendor_id | | | chip_id_hi | |
| 04 10$_{16}$ | chip_id_lo | | | | |

Wherein, 04 0C$_{16}$ and 04 10$_{16}$ are also known as the 64 bit GUID or Global Unique ID.

Root_directory

| Offset | | |
|---|---|---|
| 04 14$_{16}$ | root_length | CRC |
| | 03$_{16}$ | model_vendor_id |
| | 81$_{16}$ | vendor_name_textual_descriptor offset |
| | 0C$_{16}$ | node_capabilities |
| | 8D$_{16}$ | node_unique_id offset |
| | D1$_{16}$ | Unit_Directory offset (IEC 61883) |

-continued

Root_directory

| Offset | | |
|---|---|---|
| | D1$_{16}$ | Unit_Directory offset (EIA-775) |
| | D1$_{16}$ | Unit_Directory offset (1394WEB) |
| | Optional | |
| xx xx$_{16}$ | C3$_{16}$ | Model_Directory offset |

The IEC_61883 unit directory is shown in Table 4. This directory is referenced by the Unit_Directory offset, in the Root Directory (e.g., Root_directory table). In the Unit_SW_Version field, the least significant bit specifies AV/C (0) as specified in IEC 61883.

TABLE 4

IEC_61883 Unit Directory
Unit Directory (IEC_61883)

| directory length | CRC |
|---|---|
| 1216 | Unit_Spec_ID (1394TA = 00 A0 2D$_{16}$) |
| 13$_{16}$ | Unit_SW_Version (first pass key = 01$_{16}$) |
| . . . | <<possibly other fields>> |
| . . . | . . . |

The EIA-775 Unit Directory is shown in Table 5. The following EIA-775 specific information appears in the EIA-775 Unit Directory.

TABLE 5

EIA-775 Unit Directory

| directory length | CRC |
|---|---|
| 1216 | Unit_specification_ID (EIA-775 = 005068$_{16}$) |
| 13$_{16}$ | Unit_software_version (010100$_{16}$) |
| . . . | <<possibly other fields>> |
| . . . | . . . |

The Unit_Specification_ID specifies the identity of the organization responsible for the architectural interface of the device and the specification. In this example case, the directory and identity value=005068$_{16}$ refers to the EIA as the responsible body and the EIA-775 control architecture specification.

The Unit_software_version designates EIA-775 revision level supported by the device. The format is shown in Table 6.

TABLE 6

Unit_software_version coding

| First octet | 01$_{16}$ |
|---|---|
| Second octet | Major Version Number (currently 01$_{16}$) |
| Third octet | Minor Version Number (currently 00$_{16}$) |

The 1394WEB Unit Directory is shown in Table 7. The following 1394WEB specific information appears in the 1394WEB Unit Directory.

TABLE 7

1394WEB Unit Directory

| directory length | CRC |
|---|---|
| 12$_{16}$ | Unit_specification_ID (1394WEB = 00XXXX$_{16}$) |
| 13$_{16}$ | Unit_software_version (010100$_{16}$) |
| 38$_{16}$ | Discovery_control_bits |
| 39$_{16}$ | Assigned_Count_of_1394_devices |
| 3A$_{16}$ | IP_Address_Built_in |
| 3B$_{16}$ | IP_Address_Assigned |
|  | IP_Address_Extension Leaf |
| —$_{16}$ | <<possibly other fields>> |

The Unit_Specification_ID specifies the identity of the organization responsible for the architectural interface of the unit and the specification. In this example case the directory and identity value=00XXXX$_{16}$ refers to the responsible body and the 1394WEB control architecture specification.

The Unit_software_version designates the 1394WEB revision level supported by the device. The format is shown in Table 8.

TABLE 8

Unit_software_version coding

| First octet | 01$_{16}$ |
|---|---|
| Second octet | Major Version Number (currently 01$_{16}$) |
| Third octet | Minor Version Number (currently 00$_{16}$) |

Discovery_control_bits (38$_{16}$)

Key value (38$_{16}$) permitted by the IEEE1212R specification section 8.8 for the private use by the owner of the directory and architecture is used for the Discovery_control_bits immediate value.

TABLE 9

Discovery_control_bits

|  | FWHCP Server Agent | Configuration operating. Do not use (if True) | Which IP address? |
|---|---|---|---|
| X | Yes = 1 | 1394 Dev. Count | IP-Address | Assignd_1 Built-in_0 |
| 31 | 6 5 4 3 | 2 | 1 | 0 (LSB) |

These are control bits in 1394 ROM space 402 accessible by local and remote device. The control bits are used by the IP address configuration agent 406 and the User Interface description generation agent 408 as described further below.

In one embodiment of the invention, said control bits provide the following information:

Bit 0—Which IP address—Indicates which IP address is used or is in-use i.e, the Built-In address (=FALSE) or Assigned Address (=TRUE). This is set by the operating IP configuration agent FWHCP 406.

Bits 1, 2—Configuration Operating Do not use—When set indicate that the 1394 device discovery and also, separately, the IP configuration agents 404 and 406, respectively, are operating and therefore the values referred to are invalid as they can change or are not yet written. These bits are set by the local (device) 1394DDA agent 404. The 1394DDA agent 404 clears the 1394 Dev. Count bit and the operating FWHCP agent 406 clears the IP-address bit.

Bit 3—Presence of FWHCP Server Agent 406—Is set if the device has an operable FWHCP agent 406. This bit and GUID are used by the FWHCP agents 406 to determine which FWHCP agent 406 will operate.

Assigned_Count_of_1394_devices (39$_{16}$)—Assigned immediate value of the count of 1394 devices in the network 300. The count is made as the 1394 interface goes though its self-ID cycles. The 1394 device discovery agent 404 generates the value, which is saved in ROM space 403 for subsequent use by the IP and UI configuration agents 406 and 408, respectively.

IP_Address_Built_In (3A$_{16}$)—Assigned Immediate Value. This address is assigned at manufacture time and built-in to the device. If this Built-in address cannot be used, an alternative address can be saved in the Assigned address space and the control bit set to indicate such.

IP_Address_Assigned (3B$_{16}$)—Assigned Immediate Value. If identical IP addresses are detected, the IP address configuration agent FWHCP 406 assigns this address to prevent collision. Further, the control bit is set to indicate such.

IP_Address_Extension Leaf_for_attached_network (BC$_{16}$)— This directory entry is for the address offset to the data leaf for the IP address extension table, see Table 10. The data leaf contains IP addresses for devices on connected non-1394 networks (but also could be bridged 1394 networks). The table is included in communications devices of types (e.g., bridge) that connect through to foreign (non-1394) networks. The table can be expanded to include as many IP addresses as required. The address of the communications device itself should not be included in the table.

TABLE 10

IP_Address_Extension Leaf

| Leaf Length -1 (n)$_{16}$ | CRC-16$_{16}$ |
|---|---|
| IP Address 1 (e.g., 32 bit) | |
| ... | |
| IP Address n (e.g., 32 bit) | |

In regards to Control word for Discovery Control Bits, use of a ROM entry for the actual Discovery Control Bits word as defined herein works but is an example implementation. As ROM is not designed to be written efficiently (i.e., ROM areas have to be erased and writing them is slow relative to other hardware e.g. register). Registers are provided in the 1394 hardware for data that must be written to frequently. In another version, a 1394 Register can be used for the 'Discovery_control_bits' control word. Registers are in a space also addressable by other devices, whereby another device can look up in the ROM the address of the Register and then write to that Register.

Referring FIG. 9b, one or more devices include an IP address configuration agent (FWHCP) 406 (e.g., all UI devices and Gateway devices and any other device that can be a Control initiator). The FWHCP configuration agent 406 accesses all devices' IP address values in data in the 1394 ROM 402 across the 1394 network 300. For synchronization commencement and completion of commencement of other applications (e.g., the UI description generation), the FWHCP agent 406 also accesses the 'configuration operating' control bits.

Referring to FIG. 9c, devices capable of displaying user interfaces, and also some other devices (e.g., Gateway devices), can include the UI description generation agent (UIDGA) 408 for generating the top-level UI description 250 in e.g. HTML. Because as detailed above only one IP configuration agent 406 operates per network 300, not all devices need to include the IP configuration agent 406, though all devices can include an IP configuration agent 406. If a device has the operating IP Configuration Agent 406 and is a User Interface Device then the IP configuration agent should operate before the UI Description Generation agent. The UI description generation agent (UIDGA) 408 utilizes information including control bits defined in the 1394 ROM space 402 and other information (e.g., for determining which FWHCP operates is the Global Unique ID (GUID) of Bus_Info_Block of Table 3) for determining which IP configuration agent 406 (if multiple in the network) operates, synchronizing commencement and for access to the in-use IP addresses. Any device may have and operate a UIDGA for making the HN_Directory page (top-level discovery page). After the IP addresses are configured UIDGA reads the addresses to make the HN_Directory page. In each client device, when UI description generation is complete, the GUI generation and run-time environment 410 (e.g., Web Browser 200 in FIG. 2) uses the UI description HTML file 250 to access all devices' HTTP file space for icons, names and logos (icon.HTM, Name.HTM and Logo.HTM are contained in pages 204, and 204) to generate the full top-level GUI 220 for display in that client device. Web Browser uses HTML file 250 to render the actual GUI graphics, in the process accessing files from the devices e.g. Icon.HTM, Name.HTM and Logo.HTM and in turn accessing any additional files these files reference e.g. ICON.GIF and LOGO.GIF.

1394 Device Discovery Agent (1394DDA)

Referring to FIGS. 9a–c, 10 as discussed, each 1394WEB device in the network 300 can include the device discovery agent 404. The device discovery agent 404 enumerates the 1394 devices in 1394 address space connected to the 1394 bus, wherein the raw discovery is performed in 1394 hardware. The Self_ID and Physical Node Number Assignment and the steps leading to it is the basic discovery process performed by the interface hardware/firmware. All devices monitor the Self_ID cycles and make a note of the existence of 1394 devices. This is a part of 1394 software for any 1394 device: (1) Reset—Bus reset propagates to all interfaces, on device power-up, device attachment and device detachment, (2) Tree Identification—Transforms a simple net topology into a tree, to establish a ROOT which is master for certain functions: Bus Cycle Master, Highest priority in arbitration for bus time, (3) Self Identification—Assigns Physical Node number (address) and also exchange speed capabilities with neighbors. Highest numbered node with both Contender Bit and Link-on Bit is Isochronous Resource Manager.

The discovery agent 404 writes the final count value of the devices to the 1394 ROM space to communicate it to other agents. The device discovery agent 404 is the first software agent to execute after a 1394 reset cycle, and control bits (Discovery Control Bits 2 and 1, Configuration Operating: 1394DDA, and IP_Address) are used to delay other agents, including the configuration agents 406 and 408, from execution until the discovery agent 404 has finished execution.

In one embodiment, the 1394DDA agent 404 in each device performs the steps 500, 502 including: (1) setting synchronization control bits (i.e., '1394DDA in progress' and 'IP configuration in progress' bits) in the device's own 1394 ROM space 402 to indicate that the 1394DDA in progress and IP configuration is in progress (IP configuration will not be in progress if 1394 DDA is executing) and that the values of 1394 device count and IP address are not valid, whereby said control bits inhibit other agents (e.g., 408) from operating prematurely; as such the 1394 DDA executes, then an elected FWHCP executes, and then (usually for UI device) UIDGA executes; (2) counting the number of 1394 self-identity sequences after a 1394 Reset to discover the number of devices and effectively their local node addresses for use by the other agents 406, 408; (3) writing the device count value to the device's own 1394 ROM space 402; and (4) clearing (e.g., to false) the synchronization control bit for '1394DDA in progress' in the device's own 1394 ROM 402, wherein the 'IP configuration in progress' bit remains set and is cleared later by the operating FWHCP agent 406.

Alternative Architecture for Configuration with IP Address list in network communication (bridge) device is possible. For example, the IP address list of IP addresses of devices on a bridged (e.g., non-1394 network) can alternatively be examined at the IP configuration stage by the FWHCP agent 406 rather than only at the UIDGA stage by the UIDGA agent 408. This allows the FWHCP agent 406 to detect and correct address collisions and therefore allow operation without having two separately defined address ranges, one for the 1394 network 300 and one for the non-1394 network 119. Correction of address collision can be accomplished by modifying the address of a colliding 1394 device as the bridged network IP address list cannot be modified by the aforementioned agents 406, 408 for the 1394 network 300. Configuration is more reliable if the FWHCP agent 406 can check the addresses in the bridged network 119 for collision prior to allowing the addresses used on the 1394 network 300.

IP Address Configuration Agent (FWHCP Agent)

Referring to FIGS. 9a–c, 10 the IP Address Configuration software agent (FWHCP) 406, operates to provide 'Fixed' IP address management and to detect and correct IP address clashes in the mass manufactured 1394 devices. All 1394WEB UI devices include, and other devices can include, an FWHCP agent 406. Only one FWHCP agent 406 operates in the network however. The 1394DDA 404 agent is the first software agent to execute after a 1394 reset cycle, and as aforementioned the 1394DDA 404 agent sets the '1394DDA in progress' and 'IP configuration in progress' bits to delay the FWHCP agent 406 until the 1394DDA agent 404 has executed to completion.

In one embodiment, the IP Address configuration agent 406 in a device performs steps including polling the 1394DDA configuration operation control bit (i.e., the '1394DDA in progress' bit) to determine if the 1394DDA configuration software agent 404 has executed to completion. If so, then the FWHCP agent 406 uses the count of devices determined by the 1394 DDA agent 404, and reads GUID's and Control Words from every device (step 504) to determine which device in the network 300 is selected to execute its FWHCP agent 406 (step 506). The selected device is one with an FWHCP agent 406 that finds it has the highest GUID (step 508). All other FWHCP agents 406 in other devices remain dormant (step 510). The operating FWHCP agent 406 reads the 'in-use' (active) IP address (determined by Discovery_control_bits BIT 0) from each local node (e.g. units present on the interface, host) and listed (step 512). In one version, the software agent makes a list for saving the IP addresses to an 'Array' as they are read (steps 514–518). The list will be in memory (RAM or DRAM) under the control of the compiler and OS. In-use status is determined by a bit setting in the device, which indicates whether the built-in or assigned address is in-use. In Table 7 the IP_address_assigned and IP_address_built_in are in the 1394Web Unit Directory.

The operating FWHCP agent 406 examines said list for collision among IP addresses listed therein (other collision detection and resolution methods can also be used) (steps 520–522). If a collision is detected, the FWHCP agent alters the colliding addresses by e.g. substituting the least significant 6 bits of IP address for their 6 bit node address (step 524). Only the minimum number of alterations are performed to relieve the collision. If one of the colliding addresses is already an assigned address, then that address is altered in preference to the colliding built-in address by e.g. incrementing the 6 bit substitute value and re-checking until the collision is resolved. The FWHCP agent 406 writes the altered value back to the device and the control bit (Discovery_Control_Bits: Bit 0) is set to indicate that the assigned IP address is in-use, and the built-in default is no longer in-use (step 526). The process is repeated for each IP address (step 528). After the collision resolution process, the operating FWHCP agent 406 accesses each device in turn and sets the 'IP configuration in-progress' bits in each device to e.g. 'false' to indicate that the indicated IP address is valid.

UI Description Generation Agent

In conventional WWW operation, users access the same top level page. Referring to FIGS. 4b, 7 and 9–11, according to an aspect of the present invention however, all UI devices (e.g., devices capable of displaying user interfaces) include an UI description generation agent (UIDGA) 408 to independently generate a top-level UI page 220 for control of the devices on the local network (e.g., network 100, network 300, etc.) by users. In one example, a client device (e.g., PC) dynamically generates a locally saved default page 220 for user control of devices connected to the network 100. This allows each UI device (e.g., DTV 102) to generate a different view 220 of the home network e.g. with a larger more prominent icon for that UI's devices displayed. As such, the user is readily made aware of which UI device is 'right here' (in front of the user) or in the case of access external to the home, no device is 'right here'. A device without a UI can generate a UI for another device but is unaware of type of device (e.g., Cable Modem generates UI of HN devices for user external to the home). In this case the actual UI device is unknown. Therefore no particular device is prominent in the GUI. Further, manufacturers of devices connected to the network 100 can provide their own GUI design 202, 204 in each device as desired. In addition later, improved Browser and Web technology designs need not be hampered by existing technology.

Non-UI devices, particularly those devices performing a gateway function, can also include a UI Description Generation agent 408 to generate top-level GUI descriptions 250, without including GUI Generation and Run-Time processes 410 (e.g., Web Browser 200) to generate and display GUIs 220. With appropriate address use (e.g., using the RFC1918 private addresses on the local HN), this allows external WWW access to the 1394WEB network devices. External addresses are assigned 'real' IP addresses suitable for Internet use. Generally there is a unit (e.g., gateway type unit) with the UIDGA 408 which represents the home to the outside Internet. The gateway's UIDGA generates a different UI description for the outside use (remote access case different from inside local device use), using the home's IP address with extended links to identify which home device local private IP address.

Figure 11:
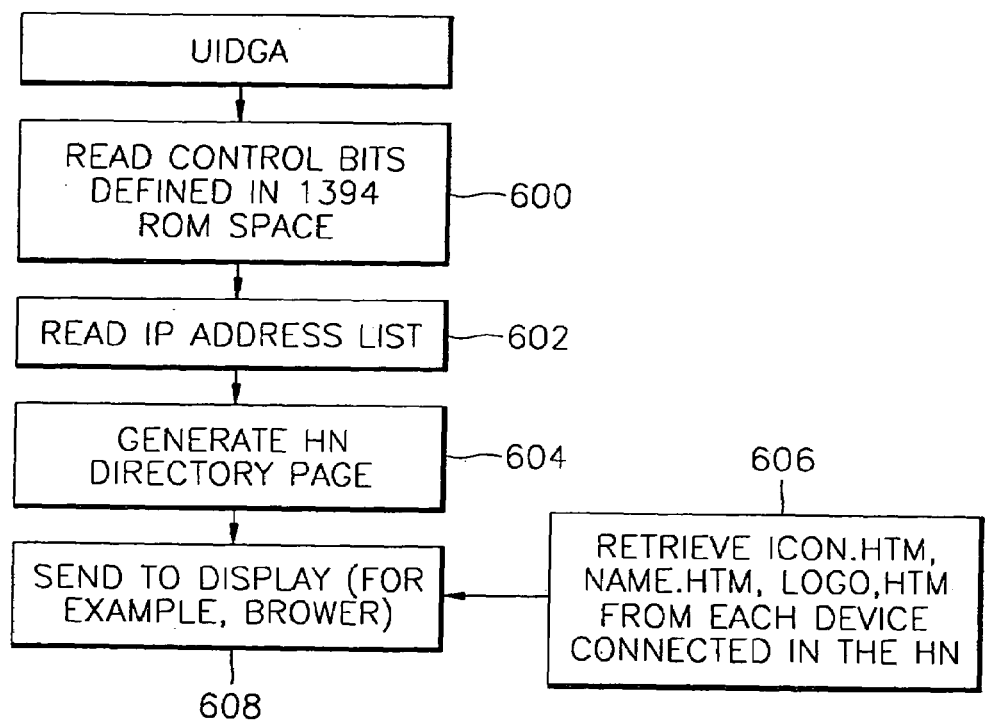
FIG. 11 shows an example flow diagram for user interface description generator agent in the home network in connection with the functional block diagrams in FIGS. 9a–c.

UI devices execute the following software processes to generate and display views 220 of the network 100/300: (1) 1394 Device Discovery Agent 404 described above, (2) UI Description Generation Agent (UIDGA) 408, and (3) GUI Generation and Run-Time (e.g., Web Browser 200) process 410. Referring to FIG. 11, in one embodiment, a UIDGA agent 408 in a device performs steps including polling the IP address configuration bits in the device's own 1394 ROM 402 to ensure completion of the FWHCP agent 406, prior to accessing any further IP information (step 600). Upon completion of FWHCP agent 406, using the count of devices generated by the 1394DDA agent 404, the UIDGA agent 408 then accesses the control word in each device currently connected to the network, to determine the settings for the 'configuration operating' false, and 'in-use' IP addresses bits (the UIDGA agent 408 makes the top-level HTML page, HN_Directory page, 220 shown by e.g., in FIGS. 5–6). Thereafter, the UIDGA agent 408 reads the actual in-use IP address value, and builds a complete list of the IP addresses of the devices currently connected to the network 300. The IP address list includes information (e.g., Icon, Logo, Name, etc.) from every device, and is written in HTML by using the IP address of each device. Before it can include the addresses, the UIDGA 408 finds the address of each device by accessing each device and checking to see which address is in use by reading Table 9, Discovery_control_bit, control bit (Bit 0). Then UIDGA 408 reads Table 7 Address either Built_in or Assigned. For devices that communicate to bridged networks, as determined by the presence of the extension IP address list entry in that device's 1394 ROM 402, the UIDGA agent 408 reads the extension IP-addresses from the list (IP_Address_Extension_Leaf) to allow those devices to be included in the GUI 220. The entry BC (IP_Address_Extension_Leaf) contains a reference link address that points to the actual data leaf. Devices on the attached bridged network are only included in the IP_Address_Extension_Leaf list if they also support the 1394WEB type of service i.e. they have Web Server and Icon.HTM etc and Control pages ('index.htm).

The UIDGA agent 408 reads the IP address list (step 602) and generates the top-level network UI description 250 (FIG. 9c) in e.g. HTML (e.g., Appendix 1) using the IP address list (UIDGA outputs the HN_Directory, top-level network UI page, HTML file) (step 604). The UIDGA agent 408 uses the IP Addresses in the hypertext links to each device for the icon.htm, name.htm and logo.htm files. UIDGA writes an HTML file including the references to each discovered device's HTML page i.e. ICON.HTM, NAME.HTM, LOGO.HTM (e.g., Appendix 2, 3, 4). The UIDGA agent 408 then uses HTML files to reference items including the icon and logo graphics files and name data, rather than including the raw icon.gif or logo.gif and raw name text in the top level UI description 250 (step 606). This allows said items to be changed by the corresponding device to reflect current status, customized by the manufacturer or configured by the user at the device, without causing any change in the top-level HTML UI description 250 in the controlling UI device. Though one graphic per device is shown in the example GUI pages 220 (FIGS. 5–6), customization allows inclusion of more than one graphic file referenced by ICON.HTM or LOGO.HTM and more text in the NAME.HTM. In one embodiment, HTML frames are utilized to implement the UI description 250 as showing in examples further below. Use of frames stabilizes the appearance of the GUI 220 in the event of 'bad citizen' devices. For example a device presenting too many words or overly large text in its 'name' frame will only affect that device's GUI look (by having some of the words truncated and not displayed) and not adversely affect the appearance of the whole Top-level GUI 220 in the UI device. The UIDGA 408 then invokes the GUI generation process 410 (e.g., browser) in a client device to generate and display a user interface (step 608).

GUI Generation and Run-Time Processes

The GUI generation process 410 (e.g., Web Browser 200) utilizes the UI description 250 in e.g. HTML to generate GUI pages 220 on UI devices. In one example, to provide keyboard-less operation for consumer electronics devices (e.g., DTV) the Browser 200 at start-up defaults to reading and rendering a locally generated 'top-level-devices.html' description 250 to generate the network top-level control GUI 220. Locally as used here means in the same device (a UI device having a UIDGA that generates the device's own HN Directory (top-level) GUI of the network devices). HN Directory, Top level Network UI and Discovery page are the same. For personal computers (PC) with keyboard this need not be the default. For CE devices, launch of the Browser 200 is delayed until after completion of the UIDGA default page 250 generation by the UIDGA agent 408. In the event that UIDGA agent 408 cannot complete its tasks, then the Browser 200 displays an alternative UI page 220 showing a network configuration error occurred (e.g., "Unable to generate the HN_Directory Page because of xxxxxx. Try disconnecting device xxxxxxx. Network configuration error number xxxxxx occurred. Contact service Tel service xxx-xxx-xxxx or Web service http://www.service.com.")

To generate the GUI 220, the Browser 200 fetches the 'icon.htm', 'name.htm' and 'logo.htm' files from device information 202, 204 in each referenced device (i.e., in the UI description, where for example ICON.HTM is in the HN_Directory Page HTML file) as defined by the HTML UI description 250. The contents of these pages 202, 204 (e.g. the icon graphic) need not be static and can be altered dynamically to reflect device status change, or after user customization. In order to display the most current top-level page 220, the Browser 200 does not cache the 'icon.htm', 'name.htm' and 'logo.htm' files. In another version, a check is always made first to determine if the device has made any changes to the HTML files 202, 204 it holds. HTTP "Conditional get" is used for checking the status of controlled device. Depending on the status code returned, the Browser 200 will either read from its cache or fetch a fresh or updated copy the HTML file 202, 204 from the devices. The HWW GUI display is not affected unless there is any change of the status of the controlled device.

The browser 200 does not attempt to display the top-level HN directory until it has been completely generated. If the HTML 250 is not generated within some reasonable amount of time, the browser displays an alternate page. If a network configuration error is the source of the problem, the alternate page might provide some technical support or user diagnostic assistance.

Whenever the user returns to the top-level HN directory or causes it to be refreshed, the browser 200 redisplays the page 220 in its entirety. This is necessary because the HTML 250 that underlies the top-level HN directory may have been regenerated if a device has been added to or removed from the network 100. It is also possible for device icons to be updated to reflect changes in their device's operating state. As such, browsers implemented by EIA-775.1 devices use HTTP "conditional get" requests to determine whether or not fresh copies of web pages or graphics are retrieved from the server.

In this aspect, the present invention provides a User Interface description where user discovery of devices is thus made entirely with references (i.e. in the abstract), where the references are 'containers' for the discovery information (e.g., text and/or graphics) of each device and resident on each device. Each 'container' includes actual textual information and/or references to one or more graphics formatted information files where each file may include one or more images and/or text. Use of the reference 'containers' allows each device to choose its preferred UI content or graphics format or alter its UI content to be displayed (by changing the text or graphic information referred to) without need to have the UI description page altered in any way. Therefore, communication of changes with the generating agent software of the Discovery UI description is not required. In one version, devices reference their e.g. ICON and LOGO graphics files indirectly using HTML files enabled by creating the network Top-level description using HTML frames. Similarly the device name that is displayed under the icon is represented by NAME HTML file. HTML files are used to reference e.g. the icon and logo graphics files and name data rather than include the raw icon.gif or logo.gif and raw name text. This allows the item to be changed to reflect current status, customized by the manufacturer or user configured at the device without causing any change in the top-level HTML description. This level of abstraction allows the Top-level UI description to be always the same regardless of the graphics ICON and LOGO file names and types and NAME text to be displayed. Also the device may use different, multiple or dynamically change the graphics files and text displayed in the Top-level GUI without the change needing to be communicated to the UIDGA. The change is automatically included whenever the GUI is redisplayed. Use of frames also stabilizes the GUI display in the event of bad citizen devices using non-displayable graphics or text as the error is confined to the particular frame and doesn't affect the whole GUI.

The change is automatically included whenever the GUI is redisplayed.

In one example, network devices top-level UI description is generated independently by any network device and certainly by devices capable of displaying UI (UI device). Generating a user interface in each device rather than generating a centrally UI, allows a device to show its own device icon/text preferentially in the GUI. In addition each GUI is manufacturer customizable, user configurable and also more reliable because it does not depend on another device e.g. a single central server. This is demonstrated with the 1394 scheme above. Multiple UI generation is enabled because all device IP addresses are accessible via the 1394 interface. UI devices (with Browser) include UIDGA agent to generate their own top-level GUI description after a 1394 reset cycle when a device attached or power-up.

All UI devices independently generate a top-level UI page for control for the local network. This is different from the conventional WWW operation wherein users access the same top level page. According to one version the present invention, the client device (e.g., PC) dynamically generates a locally saved default page file for any purpose, allowing each UI device (e.g., DTV) to generate a different view of the home network e.g. with a larger more prominent icon for its own display. Further manufacturers have scope to make their own GUI design better then another. In addition later, improved Browser and Web technology designs need not be hampered by earlier technology.

Referring to Appendices 1–4, illustrative examples for the following are provided: (1) Top-Level Page description 250 (Appendix 1); (2) Background.htm (Appendix 2); (3) Icon.htm (Appendix 4); and (4) Name.htm (Appendix 4).

Linked External Web Server/service

According to another aspect of the present invention, network configuration and user interface (UI) description generation for the home network top-level page Graphical User Interface (GUI) are performed to provide external services (e.g. web services) from an external network (e.g., Portal) as well as from home network devices 11. In one embodiment, The external network includes interconnected devices providing services (e.g., servers comprising one or more computing systems executing software for providing services). As such, in one example, manufacturer's Portal (external Web Server) services from an external network 702 (FIG. 7) are included in home network top-level user interface description 250.

In one implementation, internet gateway address of a gateway 700 is defined in an address space visible to all 1394 devices in the home network 300. Thereafter, for at least one device 11 (e.g., client device 12 such as DTV 102) in the home network 300, if a gateway 700 is detected by e.g. the discovery agent 404, then the UI description generator agent (UIDGA) 408 of that device 11 can include external IP addresses in the home network top-level UI description (TLNUID) 250 (as well as Home Network device addresses described above) of that device 11.

Alternatively, each device 11 can discover the gateway device 700 by communicating and obtaining information, for example, from another device (such as DTV 103, or cable modem) to get the gateway IP address, or the device 11 can communicate with the gateway device (use gateway device's internal IP address) to get the public/external IP address of gateway device. External services from an external network 702 of interconnected devices 704, can be accessed from one or more IP addresses (or Portal) known to the UIDGA 408 when the top level GUI 220 is generated or refreshed in that device 11. In a version, the external home portal IP address is preprogrammed into the UIDGA 408, whereby the UIDGA 408 need not obtain the external address through the gateway device. In one example, each device 704 includes one or more computing/computer systems executing software for providing services (web services), wherein the devices 704 are interconnected via routers and communication links (e.g., Internet).

Figure 12:
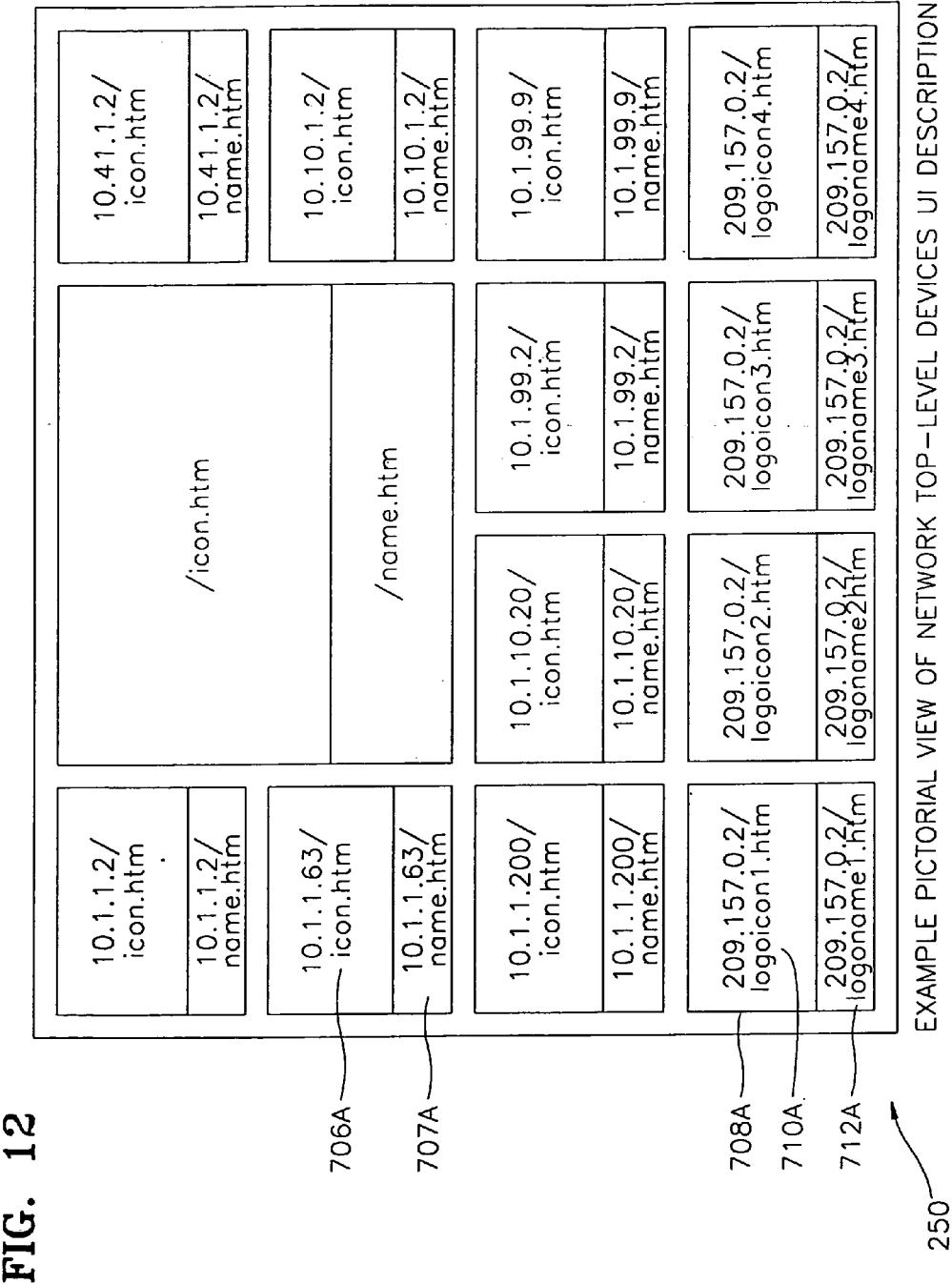
FIG. 12 shows a pictorial outline of a top level network user interface description including links to external services, showing actual icon and name HTML file references and addresses, according to another aspect of the present invention.
Figure 13:
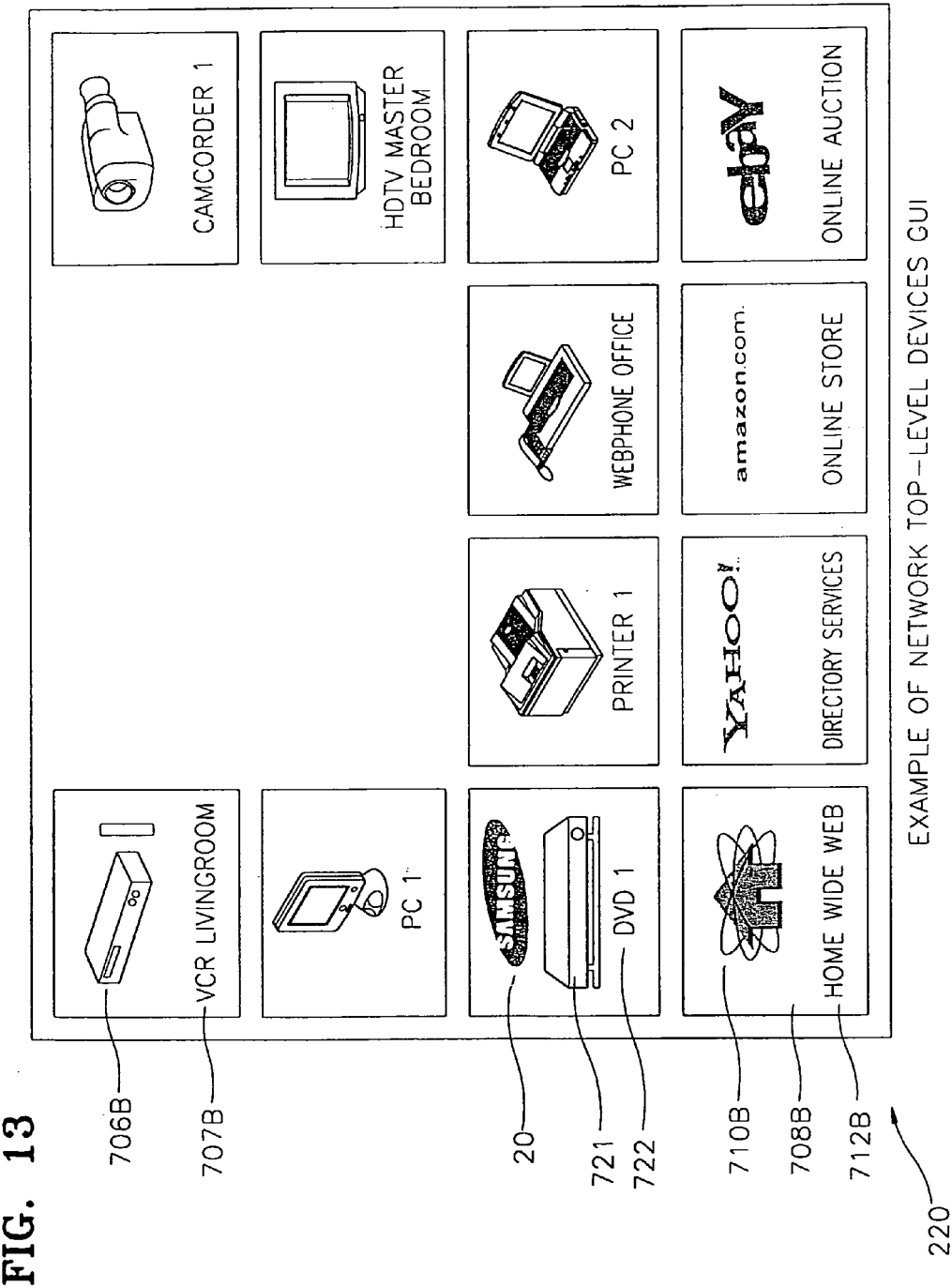
FIG. 13 shows example top-level GUI representing the functions of devices in a home network and services provided by an external network, based on the user interface description of FIG. 12.

FIG. 12 illustrates a pictorial outline of the TLNUID 250 showing actual HTML file name reference and address of a logoicon htm file 710A (residing in a server 704 in the external network 702), and an actual HTML file name reference and address of a logoname htm file 712A (residing in a server 704 in the external network 702). FIG. 13 illustrates the Browser rendered GUI 220 based on the TLNUID 250. Content of logoicon and name items 710B, 712B in FIG. 13 for services from the Portal are refreshed whenever the top-level GUI page 220 in that device 11 is updated. Further, Portal or content page hits are generated whenever the network top-level GUI 220 in that device 11 is refreshed (and preferably not when top-level description 250 is generated).

In one example implementation, the manufacturer of a device 11 (e.g., DTV 102) can choose to program the UIDGA 408 in that device 11 to include externally provided service logos icons in the home network top-level GUI 220 of the device 11. Such functionality is built-in to the GUI description generator agent (UIDGA) 408. The service logo page 708B, logo graphics 710B and text 712B, address a web server 704 external to the home network. The logos 710B can represent, and be actively hyper-linked to, services, information, media etc. provided by devices 704 in the external network 702 via the gateway 700. Further, device icon spaces 708B unused in the Top-level Home Network device's page 220 can be filled with service logos or icons 710B and names 712B from an external Web site provided by a server device 704. In one example, there can be as many as 12 unused icon spaces for a minimum home network including one device. Referring to the example TLNUID 250 and the GUI 220 in FIGS. 12–13, there are a minimum of 12 service logo-graphic 710B, logo-name 712B sets for the GUI 220. The logo file names 710A can have a number from 1 to 12 e.g. logoicon1.htm through logoicon12.htm, and are accessed in order from lower to higher numbers. Similarly, the name file names 712A can have a number from 1 to 12 e.g. logoname1.htm through logoname12.htm, and are accessed in order from lower to higher numbers. The following example specification is similar to that for device icon described above.

A logo icon and name file, 710A, 712A, respectively, per service represent the service graphically in the Top-level Home Network devices page 250 shown in FIG. 12, and in the corresponding GUI 220 shown in FIG. 13. A graphic file 710B having a name is referenced in a corresponding HTML page 710A. The graphic 710B is hyper-linked to the service top-level page 710A. An example graphic specification can include: Graphic file type of GIF, JPG or PNG (any name), and Logo icon graphic maximum size of 70(V)×130(H) pixels. An HTML page 250 references the graphic file 710A, with the first accessed file 710A representing the primary service logo graphics 710B named logoicon1.htm 710A. Subsequent logos can use files with incrementing number. It is possible to include more than one graphic reference in logoicon1.htm. In this case the service image is hyper-linked to the service home page and the second image (e.g., logoincon1_1.htm) can be hyper-linked to a different location.

Further, a minimum of one logo name file 712A includes text 712B to augment the logo graphic (logoicon.htm) in the Top-level Home Network devices page 250. The text 712B includes a few words to go with the service logo icon graphic relevant to the service. Name (e.g., "VCR livingroom" as name of a VCR in the livingroom) can include text in an HTML page called logoname1.htm. Subsequent logos can use files with incrementing number. Preferably, only the file name is standardized and not the text. The text can also be hyper-linked. An example specification can include: Text unspecified, without font restriction. As an example with Font size 10, two lines of text can be displayed under the logo icon.

An example discovery process supported by every home device 11 supporting the EIA-1394WEB standard is now described. Because user control of devices indirectly via a Graphical User Interface (GUI) 220 is important for keyboard-less operation of devices 11 anywhere on the Home Network 300, and for services provided by devices 704 outside the home network 300, one function of the discovery process is to bootstrap Internet Protocol and bootstrap Web based control. The former includes device discovery 404 and IP address configuration 406 and the latter includes generation of a top-level network user interface description (TLNUID) 250 by the UIDGA 408 for the Browser default page that it renders to generate the top-level user control GUI 220. The UI description (GUI source description) 250 in FIG. 12 includes graphical icon reference 706A and a textual name reference 707A representing each device 11 in the home network 300, corresponding to graphic 706B and name 707B, respectively, in FIG. 13. The UI description (GUI source description) 250 further includes the graphical icon reference 710A and a textual name reference 712A representing each external service from the external network 702, corresponding to graphic 710B and name 712B, respectively, in FIG. 13. The Browser collects a graphic image(s) and name from each device and service, as renders the GUI 220 as shown by example in FIG. 13.

Each 1394WEB UI device 11 (e.g., client device 12 such as HDTV 102) separately generates the network top-level UI description 250, allowing the device to give priority to itself in the displayed GUI. In FIGS. 12–13 a host HDTV 102 that generates and presents the top-level GUI 220 assumes priority and uses a 4× large size icon. Different manufacturers can develop their own GUIs and can develop different ones for each device model wherein e.g. a hand-held Web controller generates a much simpler GUI than a HDTV.

For a home network connected 300 to an external network 702 such as the World Wide Web (e.g., via the internet), device (e.g., TV) manufacturers can design a device UIDGA 408 to include logo or icon pages (e.g., logoicon1.htm and logoname1.htm) hyper-linked from the manufacturer's Web site in a server 704 in the external network 702. In FIGS. 12–13 the bottom row includes e-commerce logos 712B from an example external Web Server or Home Portal, address 209.157.0.2, operated by a TV manufacturer. The primary logo item shown on the left hand side is an example logo graphic 710B and name 712B from the manufacturers Web site (e.g. domain name homewideweb.net, address 209.157.0.2). In that example, the YAHOO™ icon embedded in the second logo page (e.g., logoicon2.htm and logoname2.htm) is obtained from the TV manufacturer's Web site or Home Portal and not directly from the YAHOO web site. The TV manufacturer may allow customization of the GUI 220 wherein service icons and logos are obtained from a Web Server or Portal outside of the manufacturer's control.

Figure 14:
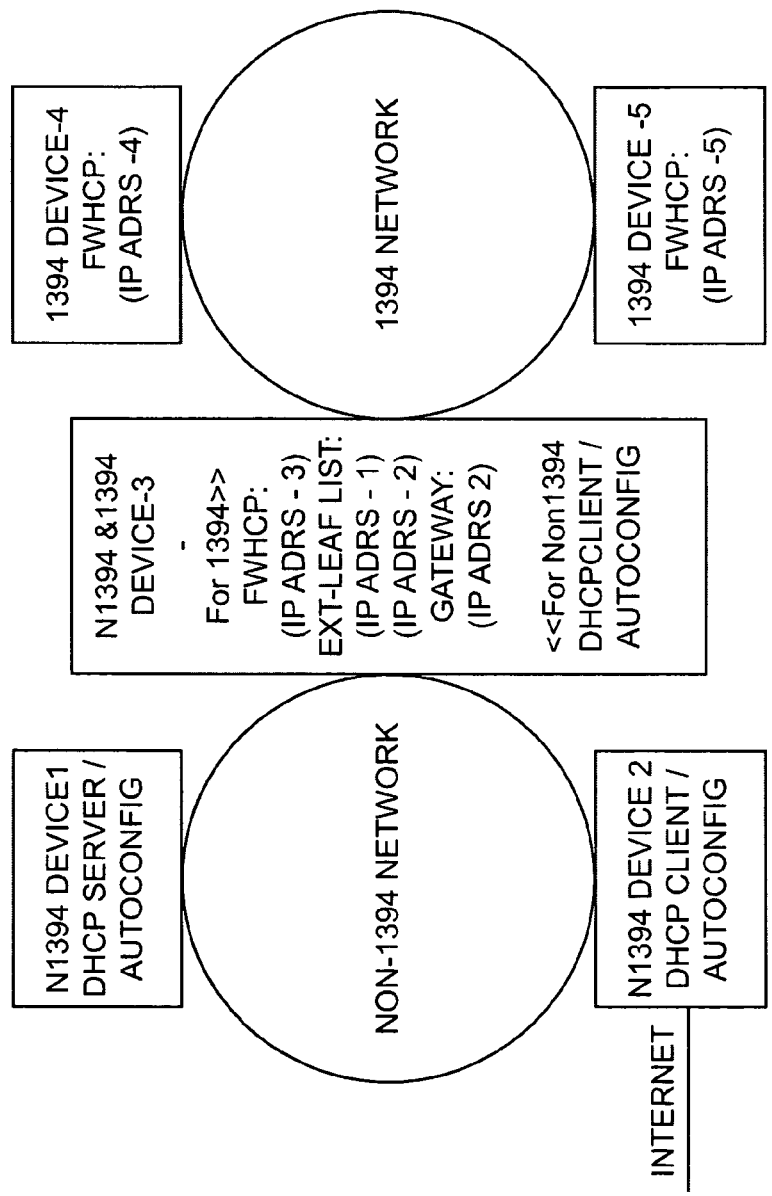
FIG. 14 shows another example process according to another aspect of the present invention for communication between a 1394 network and a non-1394 network for IP address configuration.

In one example, the discovery process reads information from the 1394 address space data storage (e.g., configuration ROM structure), as defined in clause 8 of ISO/IEC 13213. Although called 'ROM' it is assumed that the address space is write-able to allow user configuration and modification of user relevant stored values. The discovery process substantially comprises the steps described hereinabove, with the following additional or different functions for external Web link. Each device 11 keeps an extension data leaf in 1394 ROM space for IP addresses of devices 704 on the non-1394 network 702 (e.g., FIGS. 7, 14), and additionally an immediate data value for the Internet Gateway address as information for all the 1394 devices 11. Any 1394 device 11 can discover the Gateway address. The Internet Gateway device 700 or a device (e.g., DTV 103) communicating with non-1394 network 702 supporting the gateway device 700 includes the IP address of the gateway in ROM space (1212R) as defined. One or more devices 11 (e.g., DTV 102) can make their own icon more prominent (bigger), give the entire GUI 220 a different look and include logos and icons 710B from the external portal (e.g. manufacturer or other website provided by one or more devices 704 in the external network 702). Logos 710B from an external Web site(s) or Portal can be included in the top-level GUI 220 under the control of e.g. the TV manufacturer provided DTV UI description generator 408, for various (e.g., business) purposes. One or more of the devices 11 can further include IP address of Internet Gateway (if gateway or bridge device if present), relevant to the discovery IP address for 1394WEB in the 1394 configuration ROM.

Figure 15:
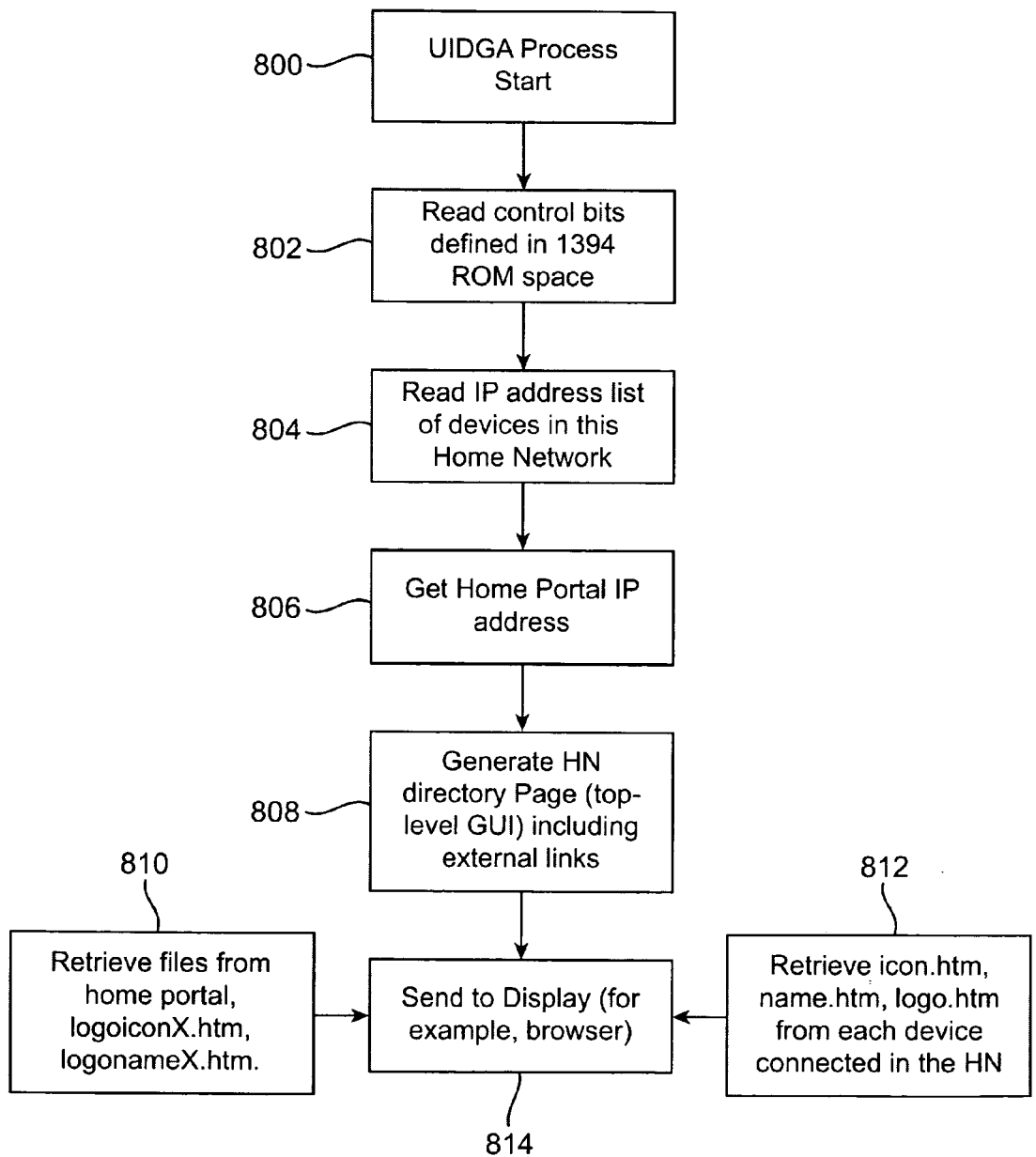
FIG. 15 shows an example flow diagram for user interface description generator agent in the home network for generating a top level network user interface description including links to external services, according to another aspect of the present invention.

Referring to FIG. 15, during an example operation scenario of a UIDGA 408 in a device 11 (step 800), if a gateway IP address is encountered during the search of 1394 ROM space (step 802), it is noted to allow inclusion of externally accessed logos 710A, 712A in the Top-Level Network UI Description (TLNUID) 250. Then the UIDGA 408 reads the IP address list of devices in the home network 300 (step 804) discovered by the DDA 404, the UIDGA 408 obtains the home portal IP address (step 806) and generates the TLNUID 250 in HTML using the IP address list, including links to external services provided by the network 702 (step 808). As shown by example in FIG. 12, the representative format of the TLNUID 250 comprises a matrix of icon graphics and underlying text representing the functions of the devices or services to the user. The Home Network devices 11 are given priority in the valuable TLNUID device-icon space. According to the TLNUID description 250, for home network devices 11, the icon.htm 706A page contents 706B are placed in the large space and, and the name.htm 707A content 707B in the smaller of the vertically adjacent frames for each device. IP addresses of devices 11 connected to the home network 300 are used in the hypertext links to each device for their icon.htm and name.htm files (shown by examples further below) (step 810).

Further, during operation of the UIDGA 408 in a device 11, if a Gateway 700 is detected (e.g., by the DDA 404), any device-icon GUI spaces remaining as a result of e.g. having a small network, using multiple levels (e.g., moving some device icons to a second level page), etc. can be used for externally accessed logo-items 708A, at the discretion of the UIDGA 408. In the TLNUID 250, the external logo-items 708A (e.g., each a logo graphic file 710A and associated name 710B) are obtained from, for example, a manufacturer's Web server (e.g. home portal) at a fixed external IP address in the external network 702 under the control of the manufacturers UIDGA 408. The logo-items 708A include predefined page names 710A, 712A, and are accessed in number order (e.g., logoicon1.htm, logoname1.htm first and then logoicon2.htm, logoname2.htm and so on) (step 812). The manufacturer (or operator of the Web server) can insert the appropriate graphics and/or text with hyper-links inside said pages 710A, 712A. As such, in this example, logoicon1.htm 710A and logoname1.htm 712A, get included in the TLNUID 250 more often, and higher numbers are included least. The TLNUID 250 is then utilized by the browser 410 to generate and display the GUI 220 (step 814).

In example versions of the TLNUID 250, HTML files are used to indirectly reference the actual graphics files 710B and name data 712B rather than directly including the raw graphic file name/type and name text. This provides a layer of abstraction that allows the item (e.g., actual graphics files 710B and name data 712B) to be changed on the device side to reflect current status, customized by the manufacturer or user configured at the device without causing any change to the TLNUID HTML 250. Though intended for one graphic, more than one graphic file and text can be referenced by icon.htm or logoiconx.htm and graphics and text referenced in name.htm and logonamex.htm.

In example embodiments, HTML frames are used to implement the UI description 250. Use of frames stabilizes the GUI 220 appearance in the event of 'bad citizen' devices. For example a device presenting too many words or over large text in its 'name' frame will only affect that device's GUI look (by having some of the words truncated and not displayed) and not adversely affect the appearance of the whole Top-level GUI. As the Top-level description 250 is generated independently by UI capable devices (e.g. client devices 12 such as DTV 102), the exact design need not be standardized. The icon and logo graphics and name maximum sizes are standardized to facilitate design of the GUI matrix.

The top-level GUI 220 including many devices 11 and services 708B can be designed according to a prior user access frequency. Devices 11 or services 708B with higher access frequency can be given prominent display on the top-level GUI 220 or higher level GUI pages for ease of use. A software agent running with the Browser can be utilized to provide such a function. The software agent monitors the user access to each device 11 or service 708B, counts the accesses and saves the number of accesses per device/service IP address to a data file in a place that is accessible by the User Interface description generator agent UIDGA 408. The data file comprises e.g. a simple list of IP addresses and counts. If a file and count already exists for a particular IP address, the new count is added to the existing value.

In one version, the UIDGA 408 is preprogrammed with one or more IP addresses in the external network 702 to access one or more external web sites, wherein a portal comprises one or more fixed web sites. The DDA 404 discovers the devices 11 in the home network 300, while the UIDGA 408 is responsible to generate the top level TLNUID 250. The gateway 700 is used to route the data to external networks 702. Every time there is a request to access an outside network 702, for example, external portal on an internet web site, the request is routed by the gateway 700 to the outside network 702 (specified by network communication). The UIDGA 408 uses the preprogrammed external portal IP address to generate the TLNUID 250 for the top-level GUI 220 including e.g. an icon graphic representation 710B for the external services, then the GUI 200 is presented to the user. When a user accesses the external link/network by clicking on an icon 710B in the GUI 220 representing a device/service in the outside network 702, the request is sent out of home network 300 to the external network 702 through the gateway 700. The Browser 410 is used to display the top level GUI 220, just the same as the case where no external links are used. In one version, the UIDGA 408 only includes a 'base' external service portal IP address (e.g. a device manufacturer's web site or portal address), without the need to know the external link IP addresses of other external services such as yahoo.com, amazon.com, which are stored in the base portal web site and then provided to the GUI 220, in files such as logoicon1.htm, described by example below.

Though in the above description an example implementation describes manufacturers as placing portal information in the devices, others are possible. Further, though the external web site is described as a device manufacturer's web site, any other external web site can also be utilized.

Referring to Appendices 5–12, illustrative examples for the following htm files for generating the TLNUID and GUI in FIGS. 12–13 are provided:

Appendix 5—Top-Level Page Example TLNUID (index.htm)
Appendix 6—background.htm example
Appendix 7—icon.htm example
Appendix 8—Example name.htm
Appendix 9—Example logoicon1.htm
Appendix 10—Example logoname1.htm
Appendix 11—Example logoicon2.htm
Appendix 12—Example logoname2.htm The Top-Level Page Example TLNUID (index.htm) 250 implements the TLNUID 250 and GUI 220 shown in FIGS. 12–13. Eight Home Network devices 11 are shown represented in the top 75% area of the GUI 200. The lower 25% of area, i.e. the bottom row, shows logo pages 708B from the manufacturer's chosen external Web Server or Portal of a fixed IP address. The TLNUID 250 is generated using frames. Hyper-links to the local device 11 graphics and name pages all use their 10.X.X.X local addresses. Hyper-links for the externally provided logo graphics and names pages 710A, 712A use the single external IP address (e.g., 209.157.0.2) provided by the manufacturer. As such control of the logo display 708B, and services offered, is provided by the TV or device manufacturer i.e. the provider of the TLNUID generator agent 408 in each of one or more devices 11. The "DVD 1" device 11 icon frame includes two graphics from the device 11. This does not affect the TLNUID 250, however when the Browser 410 renders the GUI 220, at least one icon.htm 706A can reference two graphics files, one (device graphic 721) hyper-linked to the device 11 top level control page and the other (logo 720) hyper-linked to the manufacturer Web Server for customer support, service, help, etc.

The icon.htm 706A example description page is accessed from the device 11 when the Web Browser 410 renders the top-level GUI 220 and used to fill an icon space. The browser 410 reads this page 706A and makes further accesses to the device 11 to fetch the actual graphic icon.gif 706B for display. The icon.htm 706A description shows that the device default control page index.htm is the hyper-link attached to the graphics causing the page to be fetched when invoked. When invoked the device home control page is displayed in a new Browser window.

The name.htm 707A example description page is accessed from the device 11 by the Web Browser 410 when it renders the top-level GUI 220. The text 707B contained in name.htm 707A is placed directly under the icon 706B and provides ability, through facilities provided to the user through the device control pages, to apply user-customized text under the icon.

The logoincon1.htm 710A example description page is kept on an external Web Server 704 operated by the hardware manufacturer (e.g., homewideweb.com). The page 710A can include logo graphics to enable access to a service. A hyper-link in the TLNUID 250 provides access to the external Web Server 704 supporting that particular service. In this example case the address actually corresponds to the same Web Server or the Portal supporting the logo pages themselves—domain name 'homewideweb.com'. The logoicon1.htm 710A example description page is accessed in the Web Server 704 by the Web Browser 410 in the device 11 to render the top-level GUI 220. Similarly the file logoname1.htm 712A in the server 704 is accessed by the browser 410, and the text 712B in logoname1.htm 712A is placed directly under the logo graphic 710B and can be used to augment the graphic in describing the service.

As such there is a first hyper-link between the top level page 250 in the device 11 and the logoincon1.htm file 710A in a server 704, and there is a second hyper-link between the logoicon1.htm file 710A and the actual logo graphic 710B. The UIDGA 408 places the first hyper-link to the logoicon1.htm file 710A in the top level page 250 for use by the browser 410 to access the logoincon1.htm file 710A kept in the server 704, and the browser 410 utilizes the second hyper-link in the logoincon1.htm file 710A to access the actual logo 710B (e.g., home wide web, Yahoo™, Amazon™, etc.) to display in the GUI 220 in the device 11.

In one example, the logoicon1.htm file 710A in the home portal (e.g., server 704) includes a hypertext link to the corresponding Home Wide Web icon graphics file 710B in the home portal, and the logoiconr.htm file 710A in the home portal (e.g., server 704) includes a hypertext link to Yahoo™ IP address for the corresponding Yahoo icon graphics file 710B.

The logoicon2.htm hyper-link is kept on an external Web Server 704 operated by the hardware manufacturer, and is for an external Web Server supporting a particular service. In this example, the logoicon2.htm includes hyper-link to the IP address of the YAHOO™ domain 204.71.200.75 to reference directly to the YAHOO Web site. DNS (providing name address look-up and allowing use of the name) is not required as the user interacts with the Yahoo graphic which does not change, and its hyper-link in the logoicon2.htm page can easily be changed to reflect any new address any time the GUI 220 is redisplayed/refreshed. In one example, the actual GUI 220 is generated from the HTML description 250 at start-up or re-start after a device 11 has been added to the network 300, and at a refresh.

For the example linked external web server implementation, example Table 11 below is used instead of the unit directory table 7 above, showing the EIA-775 Unit Directory, whereby the following EIA-1394WEB specific information should appear in the EIA-1394WEB Unit Directory.

TABLE 11

EIA-1394WEB Unit Directory

| directory length | CRC |
|---|---|
| $12_{16}$ | Unit_specification_ID (EIA = $005068_{16}$) |
| $13_{16}$ | Unit_software_version ($010100_{16}$) |
| $38_{16}$ | Discovery_control_bits |
| $39_{16}$ | Assigned_Count_of_1394_devices |
| $3A_{16}$ | IP_Address_Built_in |
| $3B_{16}$ | IP_Address_Assigned |
| $BC_{16}$ | IP_Address_Extension Leaf_for_attached_network |
| $BD_{16}$ | IP_Address_Internet_Gateways_Leaf |
| $—_{16}$ | <<possibly other fields>> |

The Unit_specification_ID specifies the identity of the organization responsible for the architectural interface of the unit and the specification. In this case the directory and identity value=$005068_{16}$. refers to the EIA as the responsible body and the EIA-1394WEB control architecture specification.

A data leaf contains a table of gateway IP addresses to allow for more than one gateway address. It is intended for communications devices. This may be the same device or in another device on a bridged network (e.g., FIG. 7 including the 1394 and non-1394 device). An IP_Address_Internet_Gateways_Leaf ($BD_{16}$) directory entry is included for the address offset to the data leaf for the IP_Address_Internet_Gateways_Leaf as shown in example table 12 below. Gateway addresses are used by host client software to direct external addresses to the Internet. Filtering for external addresses is by assumed sub-net mask 255.0.0.0 for the 10.X.X.X private network.

TABLE 12

| IP_Address_Internet_Gateway_Leaf | |
|---|---|
| Leaf Length −1 $(n)_{16}$ | CRC-$16_{16}$ |
| IP Address 1 (32 bit) | |
| ... | |
| IP Address n (32 bit) | |

Further, in addition to the requirement that the Bus_Info_Block, Root_Directory, and Unit Directories be present, it is also required that a Model Directory be present (e.g., Table 13 below). The following fields (defined in IEEE1212r are required of all nodes supporting the EIA-775 specification: Model_ID, Textual descriptor for Model_ID. The Model-Directory portion of the ROM is referenced by the Model_Directory offset field in the Root Directory.

TABLE 13

| Model directory | |
|---|---|
| Model_Directory | |
| directory length | CRC |
| $17_{16}$ | Model_ID |
| $81_{16}$ | device_name_textual_descriptor offset |
| ... | <possibly other fields>> |
| ... | ... |

As used herein, in one example, services provided by the network 702, or one or more of the devices 704, includes e.g. services, information, data, transactions, e-commerce, data transfer, news, information, manufacturer web sites, etc. that can be provided by the Internet and Word Wide Web. Other services provided by other external networks are contemplated by the present invention.

Although the present invention has been described in considerable detail with regard to the preferred versions thereof, other versions are possible. Therefore, the appended claims should not be limited to the descriptions of the preferred versions contained herein.

APPENDIX 1

Top-Level Page Example

```
<HTML>
<HEAD>
<TITLE>HN Devices Page</TITLE>
</HEAD>
<FRAMESET ROWS="2%,47%,2%,22.5%,2%,22.5%,2%" border=0 color=black>
    <NOFRAMES>Sorry does not support frames</NOFRAMES>
    <FRAMESET ROWS="100%,0%">
        <FRAME SRC="background.htm" SCROLLING="no" NORESIZE>
    </FRAMESET>
    <FRAMESET COLS="1.2%,23.5%,1.2%,48.2%,1.2%,23.5%,1.2%">
        <FRAMESET ROWS="100%,0%">
```

APPENDIX 1-continued

Top-Level Page Example

```
    <FRAME SRC="background.htm" SCROLLING="no" NORESIZE>
  </FRAMESET>
  <FRAMESET ROWS="48%,4%,48%">
    <FRAMESET ROWS="73%,27%">
        <FRAME SRC="http://10.1.1.1/icon.htm" SCROLLING="no" NORESIZE>
        <FRAME SRC="http://10.1.1.1/name.htm" SCROLLING="no" NORESIZE>
    </FRAMESET>
    <FRAMESET ROWS="100%,0%">
      <FRAME SRC="background.htm" SCROLLING="no" NORESIZE>
        </FRAMESET>
    <FRAMESET ROWS="73%,27%">
        <FRAME SRC="http://10.1.1.10/icon.htm" SCROLLING="no" NORESIZE>
        <FRAME SRC="http://10.1.1.10/name.htm" SCROLLING="no" NORESIZE>
    </FRAMESET>
  </FRAMESET>
  <FRAMESET ROWS="100%,0%">
    <FRAME SRC="background.htm" SCROLLING="no" NORESIZE>
  </FRAMESET>
  <FRAMESET ROWS="73%,27%">
        <FRAME SRC="http://10.1.22.1/icon.htm" SCROLLING="no" NORESIZE>
        <FRAME SRC="http://10.1.22.1/name.htm" SCROLLING="no" NORESIZE>
  </FRAMESET>
  <FRAMESET ROWS="100%,0%">
    <FRAME SRC="background.htm" SCROLLING="no" NORESIZE>
  </FRAMESET>
  <FRAMESET ROWS="48%,4%,48%">
    <FRAMESET ROWS="73%,27%">
        <FRAME SRC="http://10.1.229.1/icon.htm" SCROLLING="no" NORESIZE>
        <FRAME SRC="http://10.1.229.1/name.htm" SCROLLING="no" NORESIZE>
    </FRAMESET>
    <FRAMESET ROWS="100%,0%">
       <FRAME SRC="background.htm" SCROLLING="no" NORESIZE>
        </FRAMESET>
    <FRAMESET ROWS="73%,27%">
        <FRAME SRC="http://10.30.30.1/icon.htm" SCROLLING="no" NORESIZE>
        <FRAME SRC="http://10.30.30.1/name.htm" SCROLLING="no" NORESIZE>
    </FRAMESET>
  </FRAMESET>
  <FRAMESET ROWS="100%,0%">
    <FRAME SRC="background.htm" SCROLLING="no" NORESIZE>
  </FRAMESET>
</FRAMESET>
<FRAMESET ROWS="100%,0%">
    <FRAME SRC="background.htm" SCROLLING="no" NORESIZE>
</FRAMESET>
<FRAMESET COLS="1.2%,23.5%,1.2%,23.5%,1.2%,23.5%,1.2%,23.5%,1.2%">
  <FRAMESET ROWS="100%,0%">
    <FRAME SRC="background.htm" SCROLLING="no" NORESIZE>
  </FRAMESET>
  <FRAMESET ROWS="73%,27%">
        <FRAME SRC="http://10.41.1.1/icon.htm" SCROLLING="no" NORESIZE>
        <FRAME SRC="http://10.41.1.1/name.htm" SCROLLING="no" NORESIZE>
  </FRAMESET>
  <FRAMESET ROWS="100%,0%">
    <FRAME SRC="background.htm" SCROLLING="no" NORESIZE>
  </FRAMESET>
  <FRAMESET ROWS="73%,27%">
        <FRAME SRC="http://10.41.21.1/icon.htm" SCROLLING="no" NORESIZE>
        <FRAME SRC="http://10.41.21.1/name.htm" SCROLLING="no" NORESIZE>
  </FRAMESET>
  <FRAMESET ROWS="100%,0%">
    <FRAME SRC="background.htm" SCROLLING="no" NORESIZE>
  </FRAMESET>
  <FRAMESET ROWS="73%,27%">
        <FRAME SRC="http://10.45.1.1/icon.htm" SCROLLING="no" NORESIZE>
        <FRAME SRC="http://10.45.1.1/name.htm" SCROLLING="no" NORESIZE>
  </FRAMESET>
  <FRAMESET ROWS="100%,0%">
    <FRAME SRC="background.htm" SCROLLING="no" NORESIZE>
  </FRAMESET>
  <FRAMESET ROWS="73%,27%">
        <FRAME SRC="http://10.100.1.1/icon.htm" SCROLLING="no" NORESIZE>
        <FRAME SRC="http://10.100.1.1/name.htm" SCROLLING="no" NORESIZE>
  </FRAMESET>
```

APPENDIX 1-continued

Top-Level Page Example

```
    <FRAMESET ROWS="100%,0%">
        <FRAME SRC="background.htm" SCROLLING="no" NORESIZE>
    </FRAMESET>
</FRAMESET>
<FRAMESET ROWS="100%,0%">
    <FRAME SRC="background.htm" SCROLLING="no" NORESIZE>
</FRAMESET>
<FRAMESET COLS="1.2%,23.5%,1.2%,23.5%,1.2%,23.5%,1.2%,23.5%, 1.2%">
    <FRAMESET ROWS="100%,0%">
        <FRAME SRC="background.htm" SCROLLING="no" NORESIZE>
    </FRAMESET>
    <FRAMESET ROWS="73%,27%">
            <FRAME SRC="http://10.122.22.1/eia.htm" SCROLLING="no" NORESIZE>
            <FRAME SRC="http://10.122.22.1/eia.htm" SCROLLING="no" NORESIZE>
    </FRAMESET>
    <FRAMESET ROWS="100%,0%">
        <FRAME SRC="background.htm" SCROLLING="no" NORESIZE>
    </FRAMESET>
    <FRAMESET ROWS="73%,27%">
            <FRAME SRC="http://10.122.122.122/icon.htm" SCROLLING="no" NORESIZE>
            <FRAME SRC="http://10.122.122.122/name.htm" SCROLLING="no" NORESIZE>
    </FRAMESET>
    <FRAMESET ROWS="100%,0%">
        <FRAME SRC="background.htm" SCROLLING="no" NORESIZE>
    </FRAMESET>
    <FRAMESET ROWS="73%,27%">
            <FRAME SRC="http://10.122.122.123/icon.htm" SCROLLING="no"NORESIZE>
            <FRAME SRC="http://10.122.122.123/name.htm" SCROLLING="no" NORESIZE>
    </FRAMESET>
    <FRAMESET ROWS="100%,0%">
        <FRAME SRC="background.htm" SCROLLING="no" NORESIZE>
    </FRAMESET>
    <FRAMESET ROWS="73%,27%">
            <FRAME SRC="http://10.122.122.124/icon.htm" SCROLLING="no" NORESIZE>
            <FRAME SRC="http://10.122.122.124/name.htm" SCROLLING="no" NORESIZE>
    </FRAMESET>
    <FRAMESET ROWS="100%,0%">
        <FRAME SRC="background.htm" SCROLLING="no" NORESIZE>
    </FRAMESET>
</FRAMESET>
<FRAMESET ROWS="100%,0%">
    <FRAME SRC="background.htm" SCROLLING="no" NORESIZE>
</FRAMESET>
</FRAMESET>
<BODY BGCOLOR="#FFFFF0" TEXT="#000070" LINK"#0000ff"
ALINK="#FF0000" VLINK="#007986">
</BODY>
</HTML>
```

APPENDIX 2

Background.htm example

```
<HTML>
<HEAD>
<TITLE>Background</TITLE>
</HEAD><BODY BGCOLOR="#007986"></BODY>
</HTML>
```

APPENDIX 3

Icon.htm example

```
<HTML>
<HEAD>
<TITLE>Device Icon</TITLE>
</HEAD>
<BODY BGCOLOR="#FFFFF0" TEXT="#000070" LINK="#0000ff"
ALINK="#FF0000" VLINK="#007986">
<br><br><CENTER>
```

APPENDIX 3-continued

Icon.htm example

```
<IMG SRC="icon.gif" border=0>
</CENTER>
</BODY>
</HTML>
```

APPENDIX 4

Name.htm example

```
<HTML>
<HEAD>
<TITLE>Device Name</TITLE>
</HEAD>
<BODY BGCOLOR="#FFFFF0" TEXT="#000070" LINK="#0000ff"
ALINK="#FF0000" VLINK="#007986">
```

APPENDIX 4-continued

Name.htm example

```
<CENTER><F0NT size=+0>Samsung Device</font></CENTER>
</BODY>
</HTML>
```

APPENDIX 5

Top-Level Page Example TLNUID (index.htm)

```
<HTML>
<HEAD>
<TITLE>HN Devices Page</TITLE>
</HEAD>
<FRAMESET ROWS="2%,47%,2%,22.5%,2%,22.5%,2%" BORDER=0
COLOR=black>
    <NOFRAMES>Sorry does not support frames</NOFRAMES>
    <FRAMESET ROWS="100%,0%">
        <FRAME SRC="background.htm" SCROLLING="no" NORESIZE>
    </FRAMESET>
    <FRAMESET COLS="1.2%,23.5%,1.2%,48.2%,1.2%,23.5%,1.2%">
      <FRAMESET ROWS="100%,0%">
        <FRAME SRC="background.htm" SCROLLING="no" NORESIZE>
      </FRAMESET>
      <FRAMESET ROWS="48%,4%,48%">
        <FRAMESET ROWS="73%,27%">
            <FRAME SRC="http://10.1.1.2/icon.htm" SCROLLING="no" NORESIZE>
            <FRAME SRC="http://10.1.1.2/name.htm" SCROLLING="no" NORESIZE>
        </FRAMESET>
        <FRAMESET ROWS="100%,0%">
          <FRAME SRC="background.htm" SCROLLING="no" NORESIZE>
          </FRAMESET>
        <FRAMESET ROWS="73%, 27%">
          <FRAME SRC="http://10.1.1.63/icon.htm" SCROLLING="no" NORESIZE>
          <FRAME SRC="http://10.1.1.63/name.htm" SCROLLING="no" NORESIZE>
        </FRAMESET>
      </FRAMESET>
      <FRAMESET ROWS="100%,0%">
        <FRAME SRC="background.htm" SCROLLING="no" NORESIZE>
      </FRAMESET>
      <FRAMESET ROWS="73%, 27%">
          <FRAME SRC="icon.htm" SCROLLING="no" NORESIZE>
          <FRAME SRC="name.htm" SCROLLING="no" NORESIZE>
        </FRAMESET>
      <FRAMESET ROWS="100%,0%">
        <FRAME SRC="background.htm" SCROLLING="no" NORESIZE>
      </FRAMESET>
      <FRAMESET ROWS="48%,4%,48%">
        <FRAMESET ROWS="73%,27%">
            <FRAME SRC="http://10.41.1.2/icon.htm" SCROLLING="no" NORESIZE>
            <FRAME SRC="http://10.41.1.2/name.htm" SCROLLING="no" NORESIZE>
        </FRAMESET>
        <FRAMESET ROWS="100%,0%">
          <FRAME SRC="background.htm" SCROLLING="no" NORESIZE>
        </FRAMESET>
        <FRAMESET ROWS="73%,27%">
            <FRAME SRC="http://10.10.1.2/icon.htm" SCROLLING="no" NORESIZE>
            <FRAME SRC="http://10.10.1.2/name.htm" SCROLLING="no" NORESIZE>
        </FRAMESET>
      </FRAMESET>
      <FRAMESET ROWS="100%,0%">
        <FRAME SRC="background.htm" SCROLLING="no" NORESIZE>
      </FRAMESET>
    </FRAMESET>
    <FRAMESET ROWS="100%,0%">
      <FRAME SRC="background.htm" SCROLLING="no" NORESIZE>
    </FRAMESET>
    <FRAMESET COLS="1.2%,23.5%,1.2%,23.5%,1.2%,23.5%,1.2%,23.5%,1.2%">
      <FRAMESET ROWS="100%,0%">
        <FRAME SRC="background.htm" SCROLLING="no" NORESIZE>
      </FRAMESET>
```

APPENDIX 5-continued

Top-Level Page Example TLNUID (index.htm)

```
    <FRAMESET ROWS="73%,27%">
        <FRAME SRC="http://10.1.1.200/icon.htm" SCROLLING="no" NORESIZE>
        <FRAME SRC="http://10.1.1.200/name.htm" SCROLLING="no" NORESIZE>
    </FRAMESET>
    <FRAMESET ROWS="100%,0%">
      <FRAME SRC="background.htm" SCROLLING="no" NORESIZE>
    </FRAMESET>
    <FRAMESET ROWS="73%,27%">
        <FRAME SRC="http://10.1.10.20/icon.htm" SCROLLING="no" NORESIZE>
        <FRAME SRC="http://10.1.10.20/name.htm" SCROLLING="no" NORESIZE>
    </FRAMESET>
    <FRAMESET ROWS="100%,0%">
      <FRAME SRC="background.htm" SCROLLING="no" NORESIZE>
    </FRAMESET>
    <FRAMESET ROWS="73%,27%">
        <FRAME SRC="http://10.1.99.2/icon.htm" SCROLLING="no" NORESIZE>
        <FRAME SRC="http://10.1.99.2/name.htm" SCROLLING="no" NORESIZE>
    </FRAMESET>
    <FRAMESET ROWS="100%,0%">
    <FRAME SRC="background.htm" SCROLLING="no" NORESIZE>
    </FRAMESET>
    <FRAMESET ROWS="73%,27%">
        <FRAME SRC="http://10.1.99.9/icon.htm" SCROLLING="no" NORESIZE>
        <FRAME SRC="http://10.1.99.9/name.htm" SCROLLING="no" NORESIZE>
    </FRAMESET>
    <FRAMESET ROWS="100%,0%">
      <FRAME SRC="background.htm" SCROLLING="no" NORESIZE>
      </FRAMESET>
    </FRAMESET>
    <FRAMESET ROWS="100%,0%">
      <FRAME SRC="background.htm" SCROLLING="no" NORESIZE>
    </FRAMESET>
    <FRAMESET COLS="1.2%,23.5%,1.2%,23.5%,1.2%,23.5%,1.2%,23.5%,1.2%">
      <FRAMESET ROWS="100%,0%">
        <FRAME SRC="background.htm" SCROLLING="no" NORESIZE>
      </FRAMESET>
      <FRAMESET ROWS="73%,27%">
          <FRAME SRC="http://209.157.0.2/logoicon1.htm" SCROLLING="no" NORESIZE>
          <FRAME SRC="http://209.157.0.2/logoname1.htm" SCROLLING="no" NORESIZE>
      </FRAMESET>
      <FRAMESET ROWS="100%,0%">
        <FRAME SRC="background.htm" SCROLLING="no" NORESIZE>
      </FRAMESET>
      <FRAMESET ROWS="73%,27%">
          <FRAME SRC="http://209.157.0.2/logoicon2.htm" SCROLLING="no" NORESIZE>
          <FRAME SRC="http://209.157.0.2/logoname2.htm" SCROLLING="no" NORESIZE>
      </FRAMESET>
      <FRAMESET ROWS="100%,0%">
        <FRAME SRC="background.htm" SCROLLING="no" NORESIZE>
      </FRAMESET>
      <FRAMESET ROWS="73%,27%">
          <FRAME SRC="http://209.157.0.2/logoicon3.htm" SCROLLING="no" NORESIZE>
          <FRAME SRC="http://209.157.0.2/logoname3.htm" SCROLLING="no" NORESIZE>
      </FRAMESET>
      <FRAMESET ROWS="100%,0%">
        <FRAME SRC="background.htm" SCROLLING="no" NORESIZE>
      </FRAMESET>
      <FRAMESET ROWS="73%,27%">
          <FRAME SRC="http://209.157.0.2/logoicon4.htm" SCROLLING="no" NORESIZE>
          <FRAME SRC="http://209.157.0.2/logoname4.htm" SCROLLING="no" NORESIZE>
      </FRAMESET>
      <FRAMESET ROWS="100%,0%">
        <FRAME SRC="background.htm" SCROLLING="no" NORESIZE>
      </FRAMESET>
    </FRAMESET>
    <FRAMESET ROWS="100%,0%">
      <FRAME SRC="background.htm" SCROLLING="no" NORESIZE>
    </FRAMESET>
</FRAMESET>
<BODY BGCOLOR="#FFFFF0" TEXT="#000070" LINK="#0000ff"
ALINK="#FF0000" VLINK="#007986">
</BODY>
</HTML>
```

APPENDIX 6 background.htm example

```
<HTML>
<HEAD>
<TITLE>Background </TITLE>
</HEAD>
<BODY BGCOLOR="#007986"></BODY>
</HTML>
```

APPENDIX 7 icon.htm example

```
<HTML>
<HEAD>
<TITLE>Device Icon</TITLE>
</HEAD>
<BODY BGCOLOR="#FFFFF0" TEXT="#000070" LINK="#0000ff"
ALINK="#FF0000" VLINK="#007986">
<BR><BR>
<CENTER>
<A HREF="index.htm" TARGET="_blank"><IMG SRC="icon.gif"
BORDER=0></A>
</CENTER>
</BODY>
</HTML>
```

APPENDIX 8

Example name.htm

```
<HTML>
<HEAD>
<TITLE>Device Name</TITLE>
</HEAD>
<BODY BGCOLOR="#FFFFF0" TEXT="#000070" LINK="#0000ff"
ALINK="#FF0000" VLINK="#007986">
<CENTER>
<FONT SIZE=+0>HDTV Master Bedroom</FONT></CENTER>
</BODY>
</HTML>
```

APPENDIX 9

Example logoicon1.htm

```
<HTML>
<HEAD>
<TITLE>Logo Icon 1</TITLE>
</HEAD>
<BODY BGCOLOR="#FFFFF0" TEXT="#000070" LINK="#0000ff"
ALINK="#FF0000" VLINK="#007986">
<CENTER>
<A HREF="http://209.157.0.2" TARGET="_blank"><IMG
SRC="hww1.gif" BORDER=0></A>
</CENTER>
</BODY>
</HTML>
```

APPENDIX 10

Example logoname1.htm

```
<HTML>
<HEAD>
<TITLE>Logo Name 1</TITLE>
</HEAD>
<BODY BGCOLOR="#FFFFF0" TEXT="#000070" LINK="#0000ff"
ALINK="#FF0000" VLINK="#007986">
<CENTER>
```

APPENDIX 10-continued

Example logoname1.htm

```
<A HREF="http://209.157.0.2" target="_blank">Home Wide Web</A>
</CENTER>
</BODY>
</HTML>
```

APPENDIX 11

Example logoicon2.htm

```
<HTML>
<HEAD>
<TITLE>Logo Icon 2</TITLE>
</HEAD>
<BODY BGCOLOR="#FFFFF0" TEXT="#000070" LINK="#0000ff"
ALINK="#FF0000" VLINK="#007986">
<BR><BR>
<CENTER>
<A HREF="http://204.71.200.75" TARGET="_blank"><IMG
SRC="yahoo.gif" BORDER=0></A>
</CENTER>
</BODY>
</HTML>
```

APPENDIX 12

Example logoname2.htm

```
<HTML>
<HEAD>
<TITLE>Logo Name 2</TITLE>
</HEAD>
<BODY BGCOLOR="#FFFFF0" TEXT="#000070" LINK="#0000ff"
ALINK="#FF0000" VLINK="#007986">
<CENTER>
<A HREF="http://204.71.200.75" TARGET="_blank">Directory
Services</A>
</CENTER>
</BODY>
</HTML>
```

What is claimed is:

1. A method for providing user interfaces in a first network including first devices interconnected via a communication medium and at least one interface device connecting said first network to at least a second network providing services, comprising the steps of:

in one or more devices in the first network:

(a) obtaining information from one or more of said first devices currently connected to the first network, said information including device information comprising graphical user interface information for user interaction with that device; and (b) generating a graphical user interface description based on the graphical user interface information, the graphical user interface description including:

(1) at least one reference associated with the device information of each of said one or more first devices, and (2) at least one reference associated with the services provided by the second network;

wherein the graphical user interface description allows displaying a graphical user interface to a user for controlling the devices that are currently connected to the first network and furnishing services of the second network, via the graphical user interface.

2. The method of claim 1, wherein the first network comprises a 1394 network, and the second network comprises a non-1394 network.

3. The method of claim 1, wherein the interface device comprises a gateway device.

4. The method of claim 1, wherein the second network comprises a plurality of interconnected second devices providing one or more services.

5. The method of claim 4, wherein each of said second devices comprises at least one computer system programmed to provide services.

6. The method of claim 4, wherein:
the second network comprises the Internet, and
at least one of said second devices providing services comprises one or more web servers providing services.

7. The method of claim 6, wherein a service provided by at least one of the devices connected to the second network comprises a web site service.

8. The method of claim 1, wherein each reference in the user interface description associated to services provided by the second network comprises at least one hyper-text link to service information in the second network.

9. The method of claim 1 further including the step of:
(c) displaying a user interface based on said user interface description on a device connected to the first network capable of displaying a user interface, for user control of said first devices and communication with the second network.

10. The method of claim 9, wherein the step of displaying each user interface further includes the steps of:
using each reference in the corresponding user interface description to access the associated information in each first device;
using each reference associated with services provided by the second network to access corresponding service information;
generating the user interface including: (1) information corresponding to each first device using the accessed information in each first device, and (2) service information; and
displaying the user interface on said device capable of displaying a user interface.

11. The method of claim 1, wherein the step of generating a user interface description further comprises the steps of:
associating a hyper-text link with the device information of one or more of said first devices, and associating at least a hyper-text link with the service information provided by the second network.

12. The method of claim 1, wherein: (1) the device information in each device in the first network includes a user interface description for user interaction with that device, and (2) the service information in the second network includes at least a user interface description for user interaction with a service.

13. The method of claim 1, wherein each reference associated with services provided by the second network comprises at least one hyper-text link to service information in the second network, wherein the service information comprises at least identification information representing a service.

14. The method of claim 13, wherein the identification information comprises a logo information file including a link to a logo graphic representing the service.

15. The method of claim 1, wherein the second network includes at least a first portal for providing services, and a reference associated with services provided by the second network comprises at least one hyper-text link to said first portal, wherein the first portal includes service information comprising at least identification information representing said services provided by the first portal.

16. The method of claim 15, wherein the said identification information in the first portal further comprises a hyper-link to service information provided by a second portal in the second network.

17. The method of claim 16, wherein:
the second network comprises a plurality of interconnected computer systems programmed to provide services;
the first portal comprises one or more of said computer systems providing services of the first portal; and
the second portal comprises one or more of said computer systems providing services of the second portal.

18. A network system for performing services, comprising:
a local network of first devices interconnected via a communication medium;
an interface device connecting the local network to an external network providing services,
a user interface description generation agent in at least one of said first devices configured for:
(a) obtaining information from one or more of said first devices currently connected to the local network, said information including device information comprising graphical user interface information for user interaction with that device; and
(b) generating a graphical user interface description based on the graphical user interface information, the graphical user interface description including:
(1) at least one reference associated with the device information of each of said one or more first devices, and
(2) at least one reference associated with the services provided by the external network.

19. The network system of claim 18, wherein the local network comprises a 1394 network, and the external network comprises a non-1394 network.

20. The network system of claim 18, wherein the interface device comprises a gateway device.

21. The network system of claim 18, wherein the external network comprises a plurality of interconnected second devices providing one or more services.

22. The network system of claim 21, wherein each of said second devices comprises at least one computer system programmed to provide services.

23. The network system of claim 21, wherein:
the second network comprises the Internet, and
at least one of said second devices providing services comprises one or more web servers providing services.

24. The network system of claim 23, wherein a service provided by at least one of the devices connected to the second network comprises a web site service.

25. The network system of claim 18, wherein each reference in the user interface description associated to services provided by the external network comprises at least one hyper-text link to service information in the external network.

26. The network system of claim 18, wherein:
at least one of the first devices in the local network includes a user interface device capable of displaying a user interface, the user interface device including a user interface generation agent configured for:
displaying a user interface based on said user interface description, for user control of said first devices and communication with the external network.

27. The network system claim 26, wherein the user interface generation agent in the user interface device is further configured for:
 using each reference in the corresponding user interface description to access the associated information in each first device;
 using each reference associated with services provided by the external network to access corresponding service information;
 generating the user interface including: (1) information corresponding to each first device using the accessed information in each first device, and (2) service information; and
 displaying the user interface on said user interface device.

28. The network system of claim 27, wherein each reference associated with services provided by the external network comprises at least one hyper-text link to service information in the external network, wherein the service information comprises at least identification information representing a service.

29. The network system of claim 28, wherein the identification information comprises a logo information file including a link to a logo graphic representing the service.

30. The network system of claim 27 wherein the external network includes at least a first portal for providing services, and a reference in the user interface description associated with services provided by the external network comprises at least one hyper-text link to said first portal, wherein the first portal includes service information comprising at least identification information representing said services provided by the first portal.

31. The network system of claim 30, wherein said identification information in the first portal further comprises a hyper-link to service information provided by a second portal in the external network.

32. The network system of claim 31, wherein:
 the external network comprises a plurality of interconnected computer systems programmed to provide services;
 the first portal comprises one or more of said computer systems providing services of the first portal; and
 the second portal comprises one or more of said computer systems providing services of the second portal.

33. The network system of claim 18, wherein said at least one reference associated with the services provided by the external network is predetermined.

34. The network system of claim 18, wherein the user interface description generation agent further associates a hyper-text link with the device information of one or more of said first devices, and associates at least a hyper-text link with the service information provided by the external network, in the user interface description.

35. The network system of claim 18, wherein: (1) the device information in each device in the first network includes a user interface description for user interaction with that device, and (2) the service information in the external network includes at least a user interface description for user interaction with a service.

36. A control device for providing a user device communication and control in a local network of interconnected first devices, the local network connected via an interface device to an external network providing services, the control device comprising:
 a user interface description generation agent configured for:
  (a) obtaining information from one or more of said first devices currently connected to the local network, said information including device information comprising graphical user interface information for user interaction with that device; and
  (b) generating a graphical user interface description based on the graphical user interface information, the graphical user interface description including:
   (1) at least one reference associated with the device information of each of said one or more first devices, and
   (2) at least one reference associated with the services provided by the external network.

37. The control device of claim 36, wherein the local network comprises a 1394 network, and the external network comprises a non-1394 network.

38. The control device of claim 36, wherein the interface device comprises a gateway device.

39. The control device of claim 36, wherein the external network comprises a plurality of interconnected second devices providing one or more services.

40. The control device of claim 39, wherein each of said second devices comprises at least one computer system programmed to provide services.

41. The control device of claim 39, wherein:
 the second network comprises the Internet, and
 at least one of said second devices providing services comprises one or more web servers providing services.

42. The control device of claim 41, wherein a service provided by at least one of the devices connected to the second network comprises a web site service.

43. The control device of claim 36, wherein each reference in the user interface description associated to services provided by the external network comprises at least one hyper-text link to service information in the external network.

44. The control device of claim 36 further comprising:
 a user interface device capable of displaying a user interface; and
 a user interface generation agent configured for displaying a user interface based on said user interface description, for user control of said first devices and communication with the external network.

45. The control device of claim 44, wherein the user interface generation agent is further configured for:
 using each reference in the corresponding user interface description to access the associated information in each first device;
 using each reference associated with services provided by the external network to access corresponding service information;
 generating the user interface including: (1) information corresponding to each first device using the accessed information in each first device, and (2) service information; and
 displaying the user interface on said user interface device.

46. The control device of claim 45, wherein each reference associated with services provided by the external network comprises at least one hyper-text link to service information in the external network, wherein the service information comprises at least identification information representing a service.

47. The control device of claim 46, wherein the identification information comprises a logo information file including a link to a logo graphic representing the service.

48. The control device of claim 45, wherein the external network includes at least a first portal for providing services, and a reference in the user interface description associated with services provided by the external network comprises at least one hyper-text link to said first portal, wherein the first portal includes service information comprising at least identification information representing said services provided by the first portal.

49. The control device of claim 48, wherein said identification information in the first portal further comprises a hyper-link to service information provided by a second portal in the external network.

50. The control device of claim 49, wherein:

the external network comprises a plurality of interconnected computer systems programmed to provide services;

the first portal comprises one or more of said computer systems providing services of the first portal; and the second portal comprises one or more of said computer systems providing services of the second portal.

51. The control device of claim 36, wherein said at least one reference associated with the services provided by the external network is predetermined.

52. The control device of claim 36, wherein the user interface description generation agent further associates a hyper-text link with the device information of one or more of said first devices, and associates at least a hyper-text link with the service information provided by the external network, in the user interface description.

53. The control device of claim 36, wherein: (1) the device information in each device in the first network includes a user interface description for user interaction with that device, and (2) the service information in the external network includes at least a user interface description for user interaction with a service.

* * * * *